(12) United States Patent
Smadja et al.

(10) Patent No.: US 10,411,643 B2
(45) Date of Patent: Sep. 10, 2019

(54) FLOATING SOLAR PANEL ARRAY WITH ONE-AXIS TRACKING SYSTEM

(71) Applicant: 4CSOLAR, Inc., Walnut, CA (US)

(72) Inventors: Liliane Smadja, Chateau-Landon (FR); Paul Isaac Smadja, Chateau-Landon (FR)

(73) Assignee: 4CSOLAR, Inc., Walnut, CA (US)

( * ) Notice: Subject to any disclaimer, the term of this patent is extended or adjusted under 35 U.S.C. 154(b) by 143 days.

(21) Appl. No.: 15/214,290

(22) Filed: Jul. 19, 2016

(65) Prior Publication Data

US 2017/0040926 A1    Feb. 9, 2017

Related U.S. Application Data

(60) Provisional application No. 62/200,420, filed on Aug. 3, 2015, provisional application No. 62/339,844, filed on May 21, 2016.

(51) Int. Cl.
*H02S 20/32* (2014.01)
*H02S 30/10* (2014.01)
(Continued)

(52) U.S. Cl.
CPC .............. *H02S 20/32* (2014.12); *F24S 20/70* (2018.05); *H02S 20/00* (2013.01); *H02S 20/30* (2014.12);
(Continued)

(58) Field of Classification Search
CPC .......... H02S 10/40; H02S 30/10; H02S 20/00; H02S 20/30; H02S 20/32; H02S 20/70;
(Continued)

(56) References Cited

U.S. PATENT DOCUMENTS 4,350,143 A    9/1982 Laing
4,786,795 A    11/1988 Kurashima
(Continued)

FOREIGN PATENT DOCUMENTS

EP          2299499 B1       6/2010
JP          3172424 U        6/2011
KR     20130007156 A    *    1/2013

OTHER PUBLICATIONS

Machine translation of KR 20130007156, Kim et al., published Jan. 8, 2013, retrieved from: http://translationportal.epo.org/.*
(Continued)

*Primary Examiner* — Mayla Gonzalez Ramos
(74) *Attorney, Agent, or Firm* — Guy Cumberbatch

(57) ABSTRACT

A floating solar array made of a closed loop of flexible high density polyethylene pipes with elbows, T fittings and couplings. An anti-lift membrane fills with water and mitigates the wind forces. The array can have a stabilizing skirt going downwardly from the border of the array, especially when it is used offshore in the sea. A vertical axis tracking system with windlasses, two anchoring points and four mooring lines allows all the solar panels to face the sun throughout the day. For small lakes or mine tailing, the two anchor points will be onshore, on a concrete foundation. Winches to wind and unwind the mooring lines are located at the anchor point or on the solar array. For larger water areas, or offshore applications in the sea water, the anchor points are under water; using typically a concrete block or a suction pile solution for each anchor.

17 Claims, 29 Drawing Sheets

(51) Int. Cl.
*H02S 20/00* (2014.01)
*H02S 20/30* (2014.01)
*F24S 20/70* (2018.01)
*F24S 30/00* (2018.01)

(52) U.S. Cl.
CPC ......... *H02S 30/10* (2014.12); *F24S 2030/133* (2018.05); *Y02E 10/47* (2013.01); *Y02E 10/50* (2013.01)

(58) Field of Classification Search
CPC .......... Y02E 10/47; Y02E 10/50; F24S 20/70; F24S 2030/133
See application file for complete search history.

(56) References Cited

U.S. PATENT DOCUMENTS

| | | | |
|---|---|---|---|
| 5,431,148 A | 7/1995 | Kronberg | |
| 6,870,087 B1* | 3/2005 | Gallagher | H01L 31/02008 |
| | | | 136/246 |
| 7,063,036 B2 | 6/2006 | Han | |
| 7,891,351 B2 | 2/2011 | Hinderling | |
| 8,056,554 B2 | 11/2011 | Hinderling | |
| 8,176,868 B2 | 5/2012 | Han | |
| 8,183,457 B2 | 5/2012 | Morgal | |
| 2005/0028524 A1 | 2/2005 | Laing | |
| 2007/0283999 A1 | 12/2007 | Yekutiely | |
| 2008/0169203 A1* | 7/2008 | Yekutiely | H02S 20/00 |
| | | | 205/637 |
| 2008/0257398 A1 | 10/2008 | Laing | |
| 2009/0133732 A1 | 5/2009 | Hsia | |
| 2009/0314926 A1 | 12/2009 | Hinderling | |
| 2010/0037887 A1 | 2/2010 | Hinderling | |
| 2010/0059046 A1 | 3/2010 | Hinderling | |
| 2010/0307566 A1 | 12/2010 | Hinderling | |
| 2011/0253196 A1 | 10/2011 | Laing | |
| 2011/0277815 A1* | 11/2011 | Sankrithi | F24S 30/425 |
| | | | 136/246 |
| 2011/0291417 A1 | 12/2011 | Han | |
| 2012/0242275 A1* | 9/2012 | Kokusho | H02S 20/00 |
| | | | 320/101 |
| 2012/0305051 A1* | 12/2012 | Kokotov | B63B 21/50 |
| | | | 136/246 |
| 2013/0146127 A1 | 6/2013 | Lunoe | |
| 2014/0034110 A1 | 2/2014 | Yang | |
| 2014/0102511 A1 | 4/2014 | Kardis | |

OTHER PUBLICATIONS

Hann-Ocean Hexifloat System, online magazine PV-Magazine.com (http://www.pv-magazine.com/archive/articles/beitrag/the-power-flower-_100002749/329/#axzz3t6DttdDo), circa May 2011.

* cited by examiner

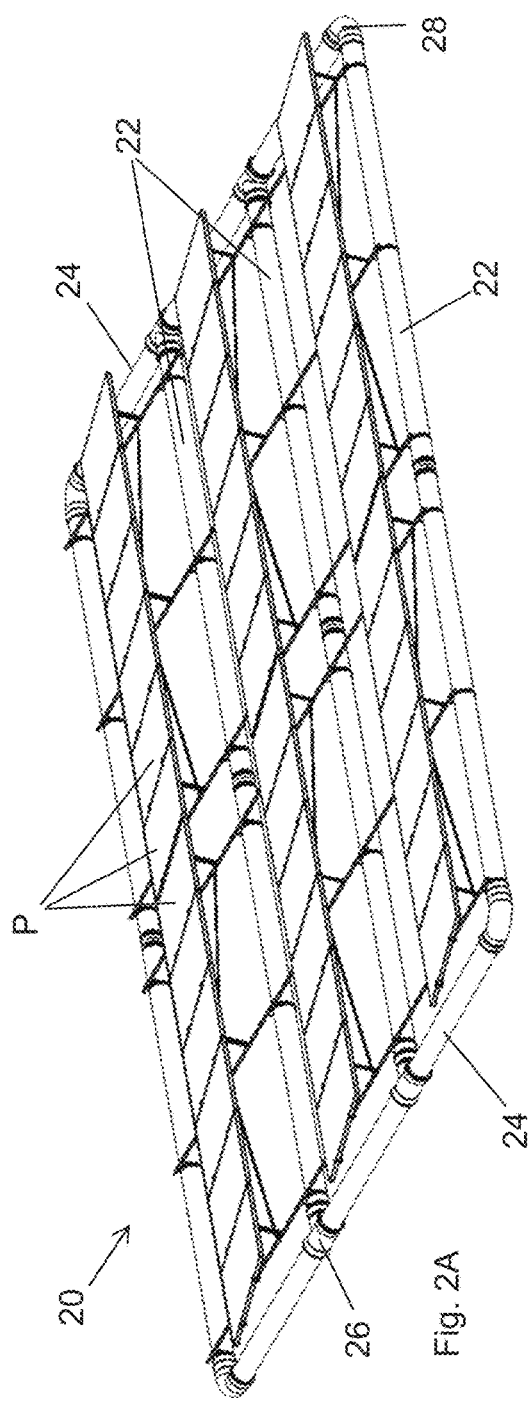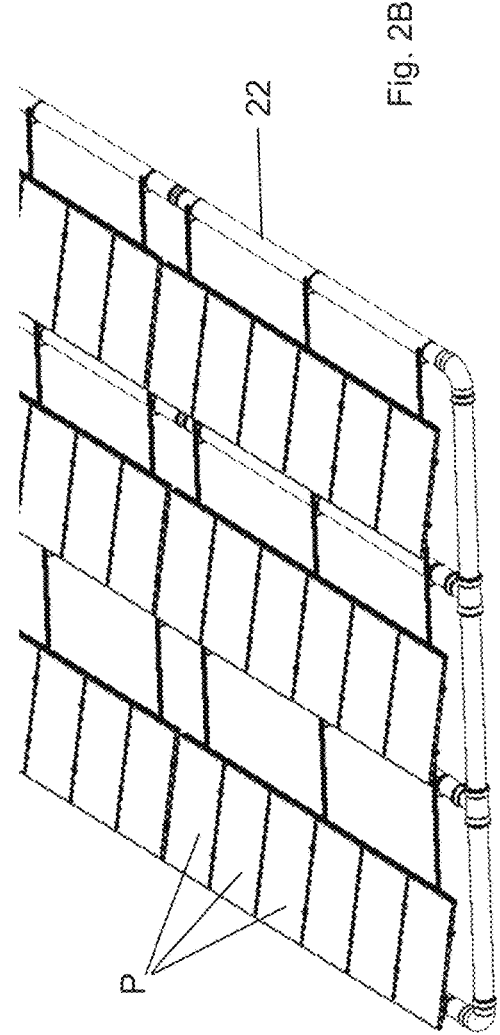

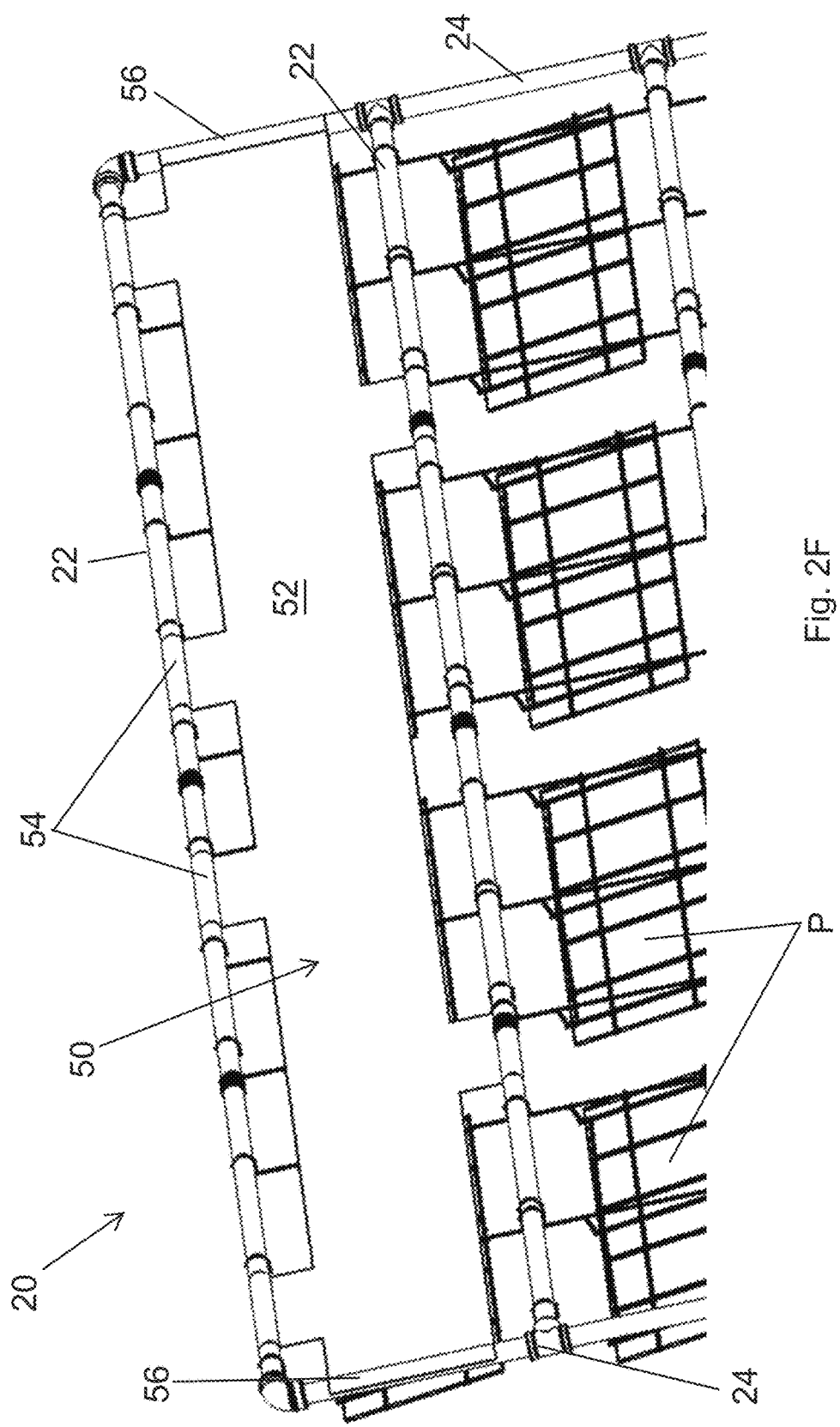

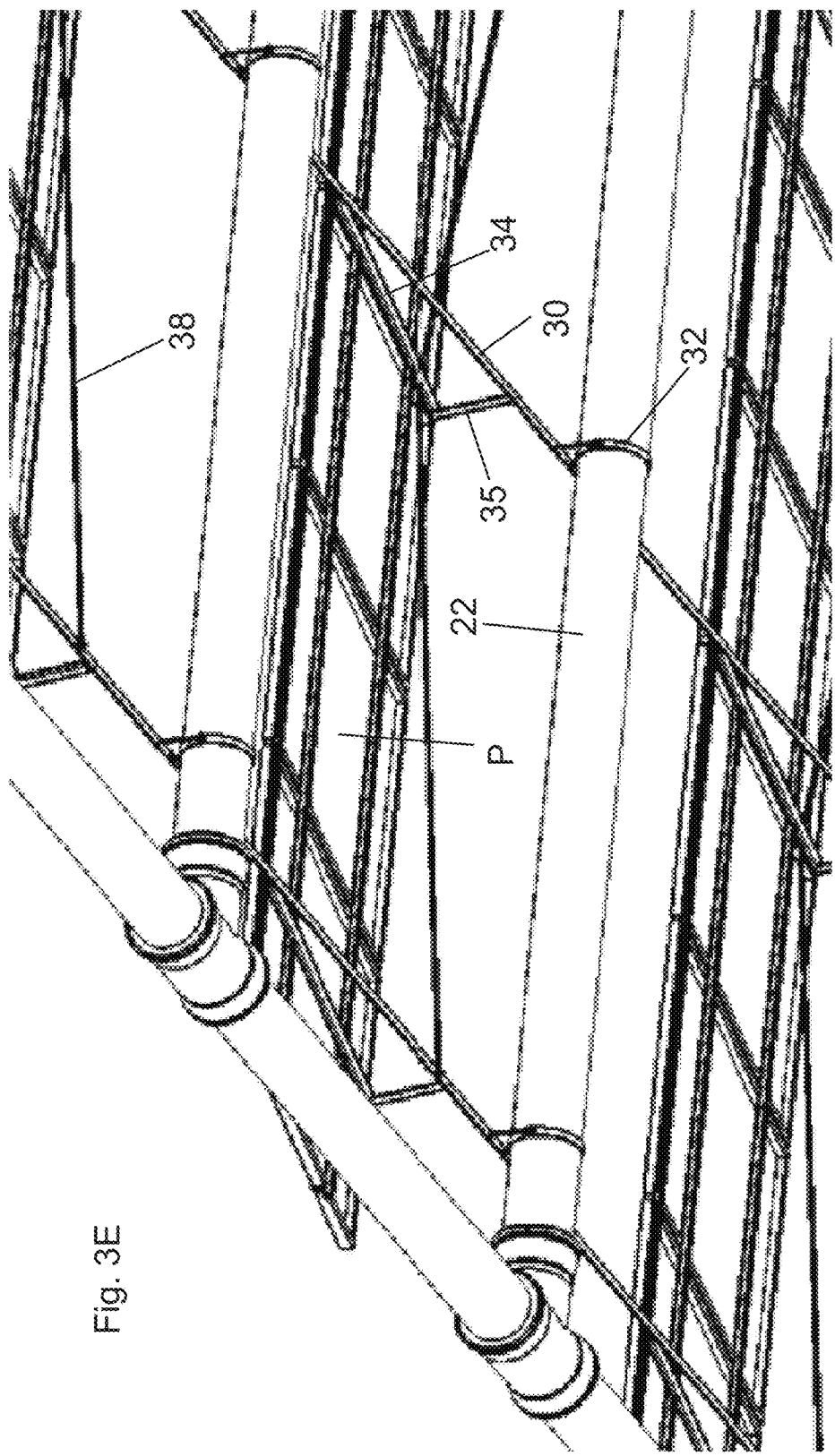

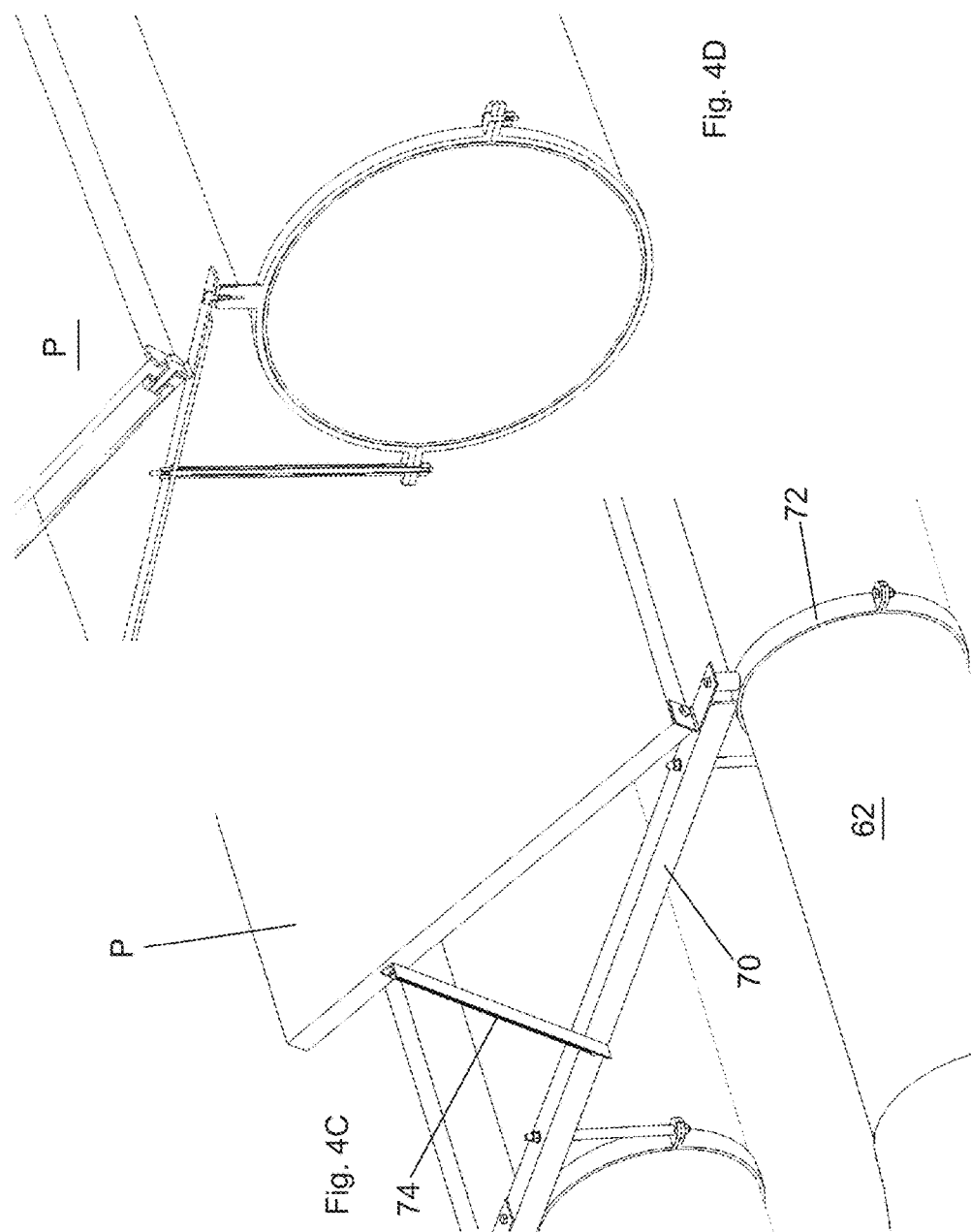

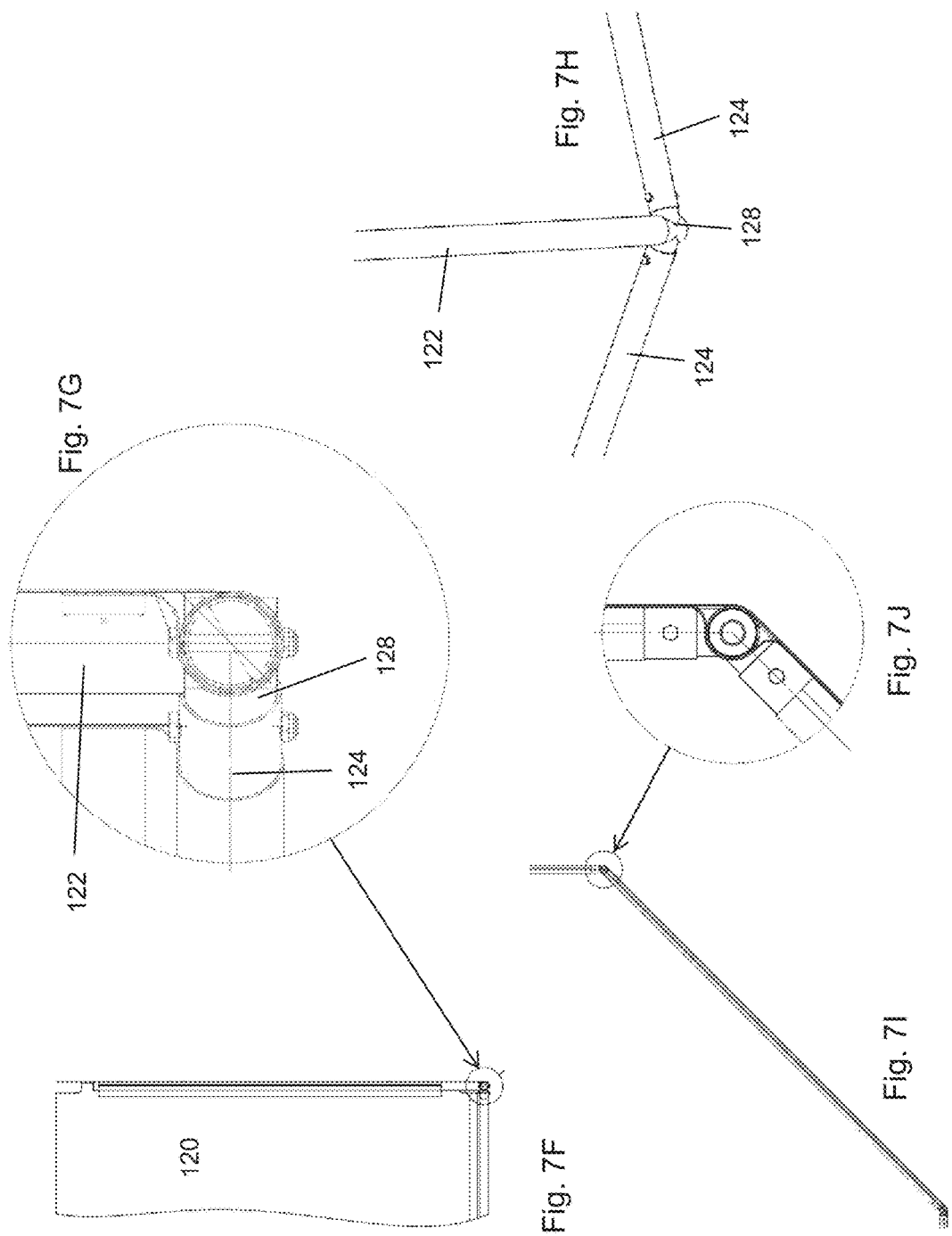

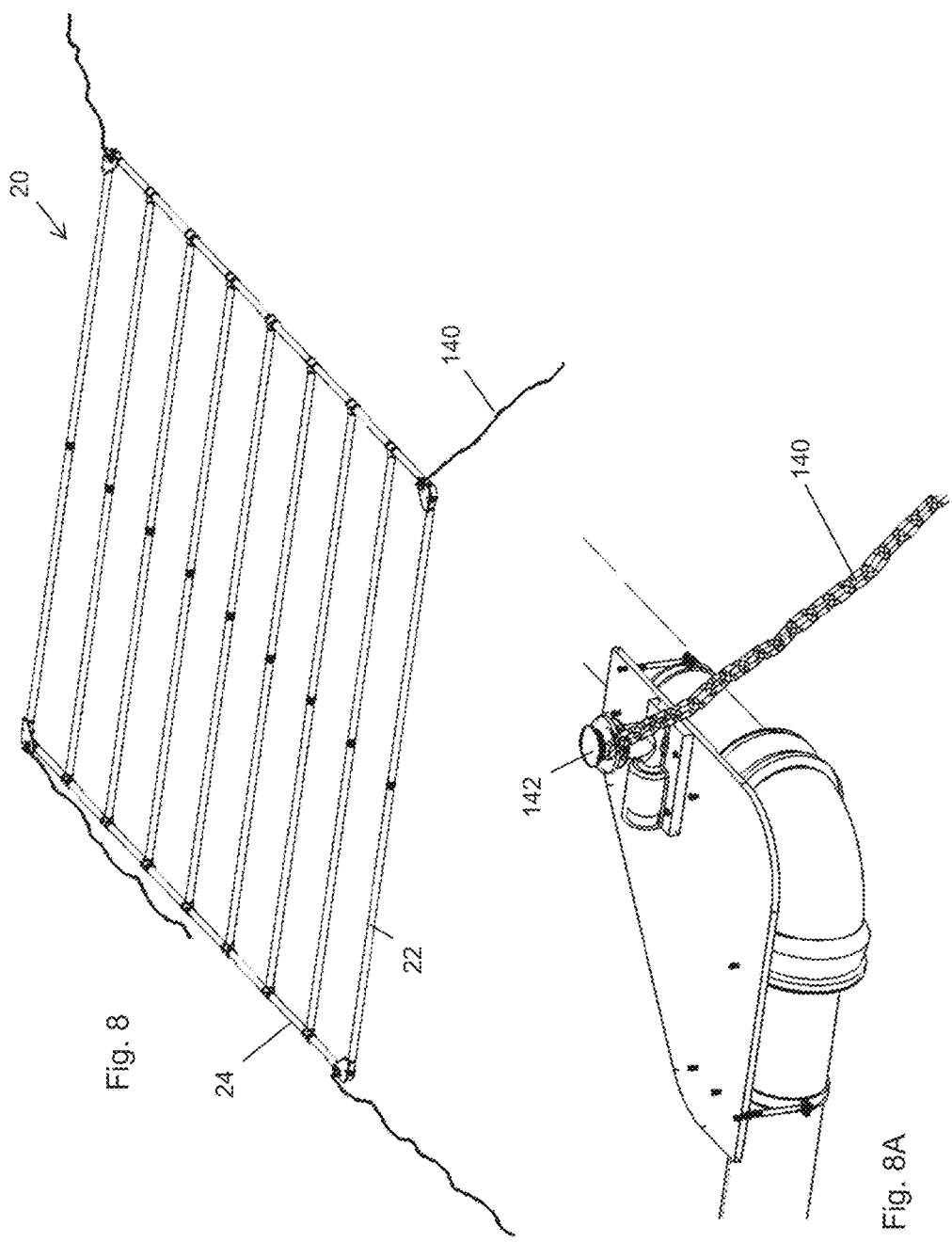

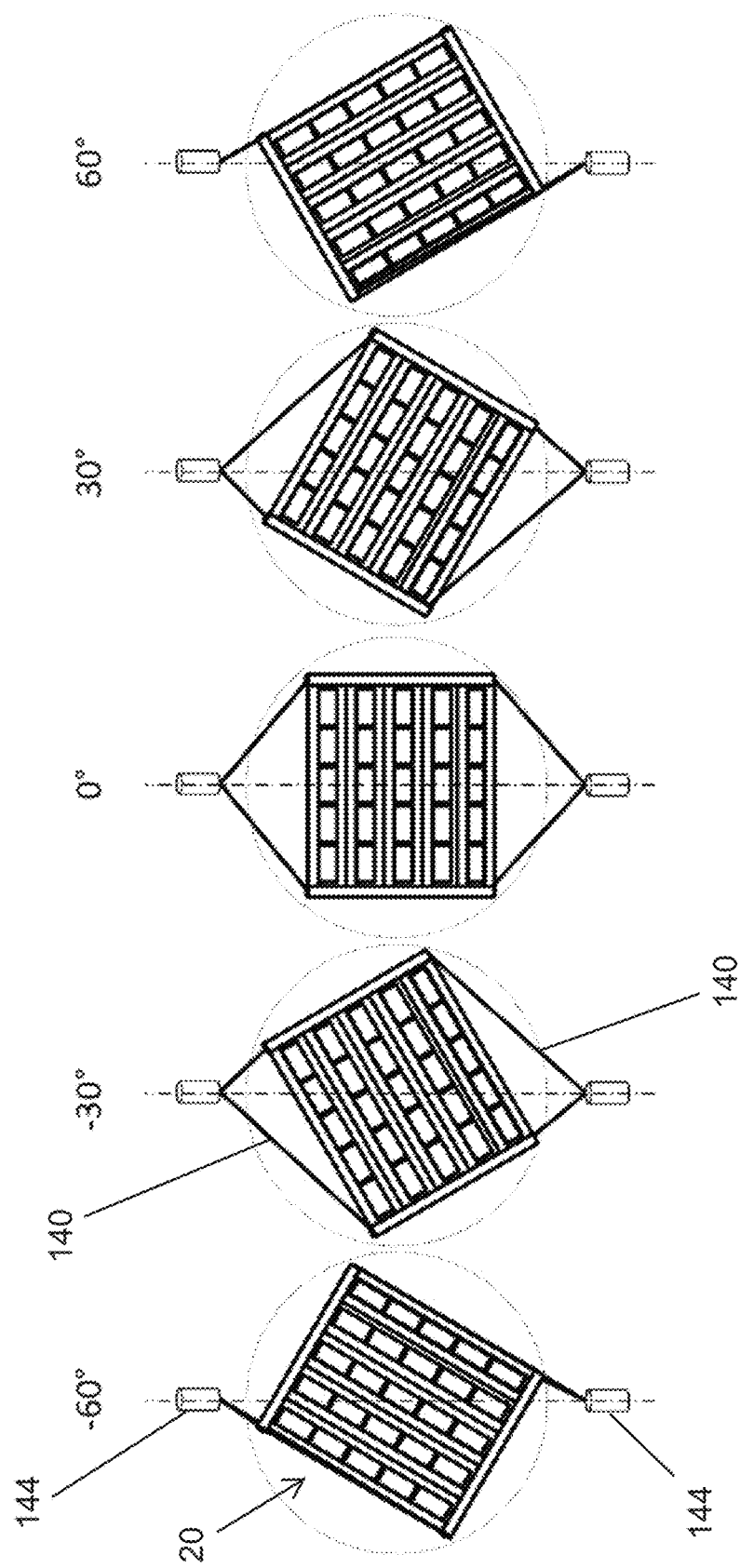

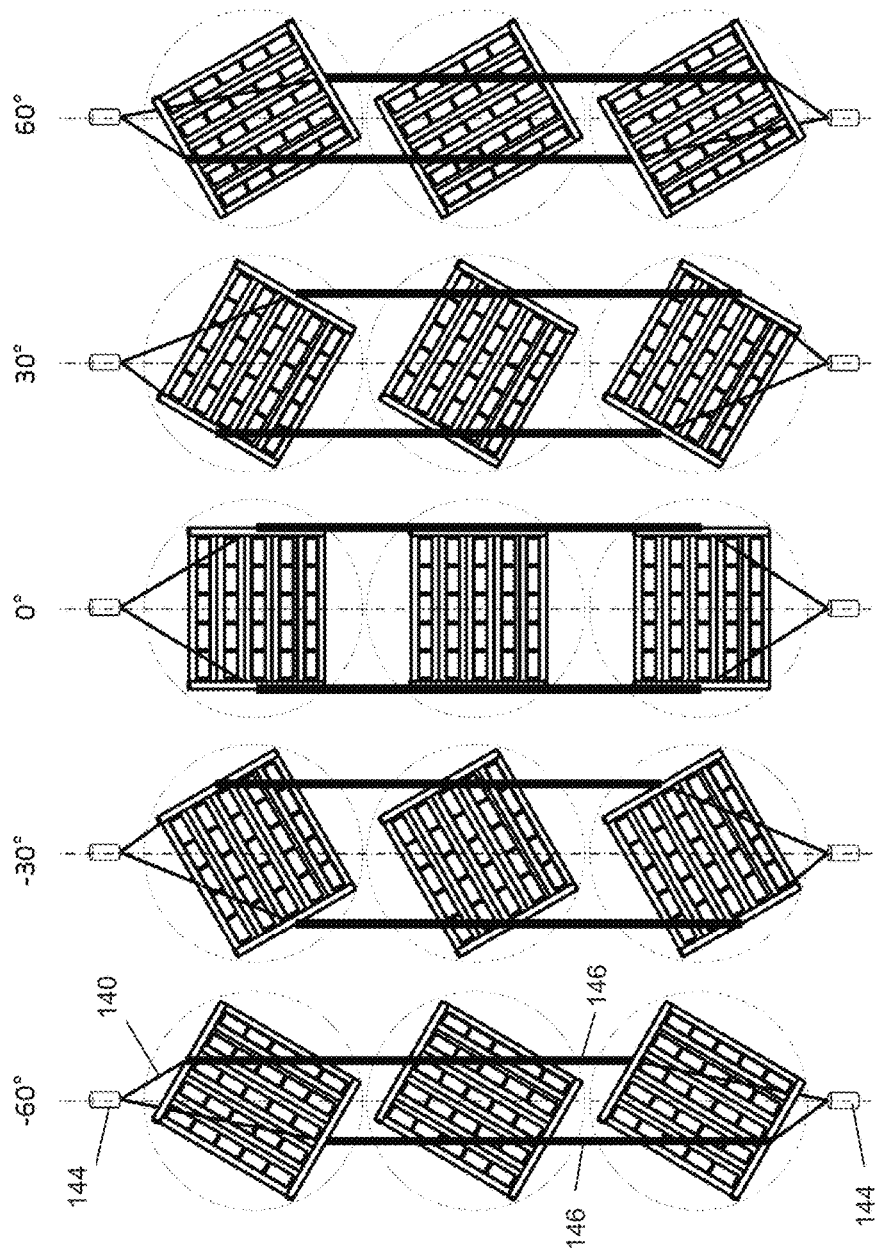

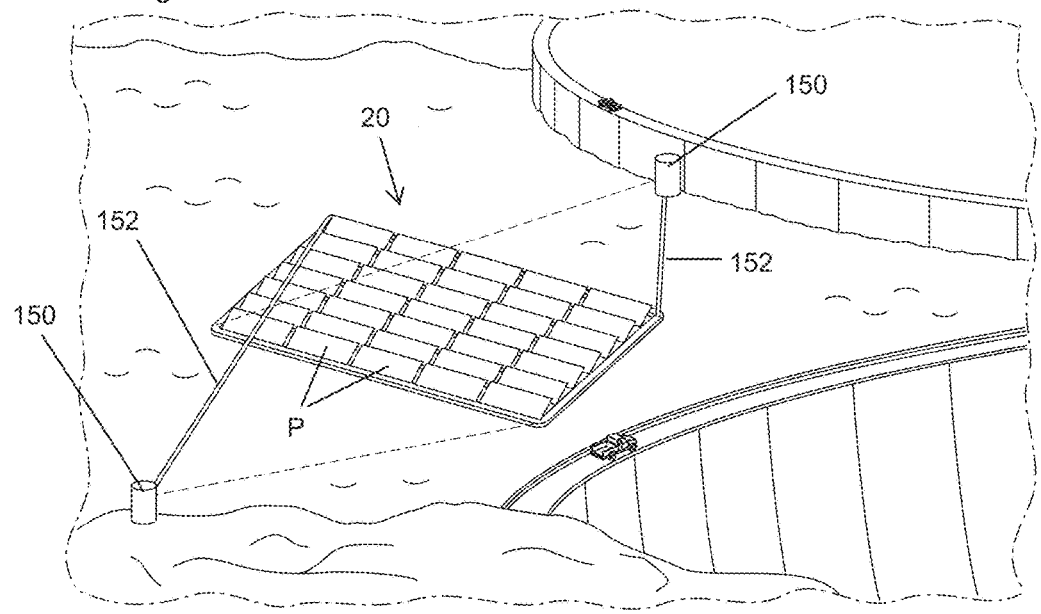
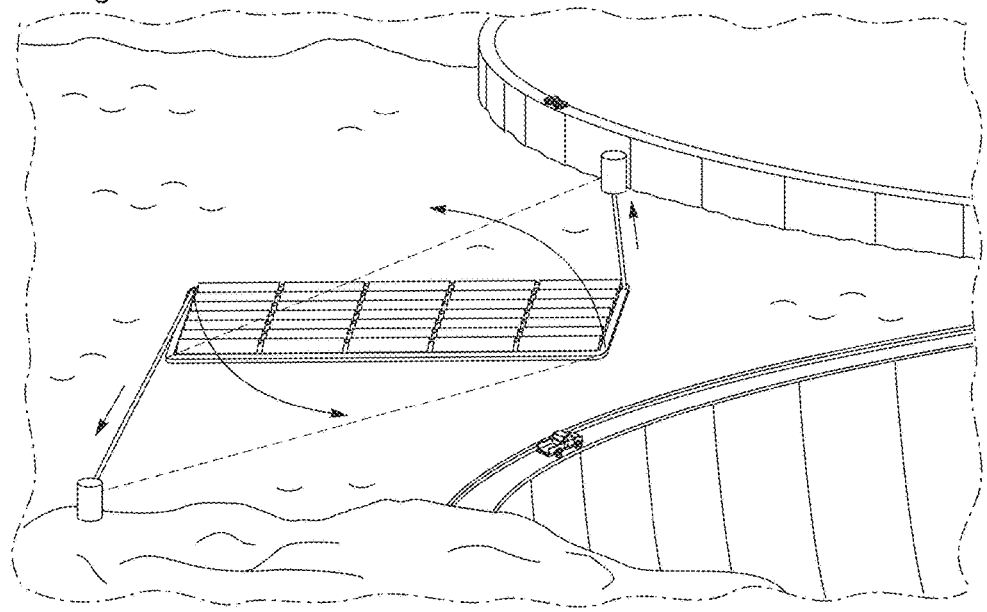

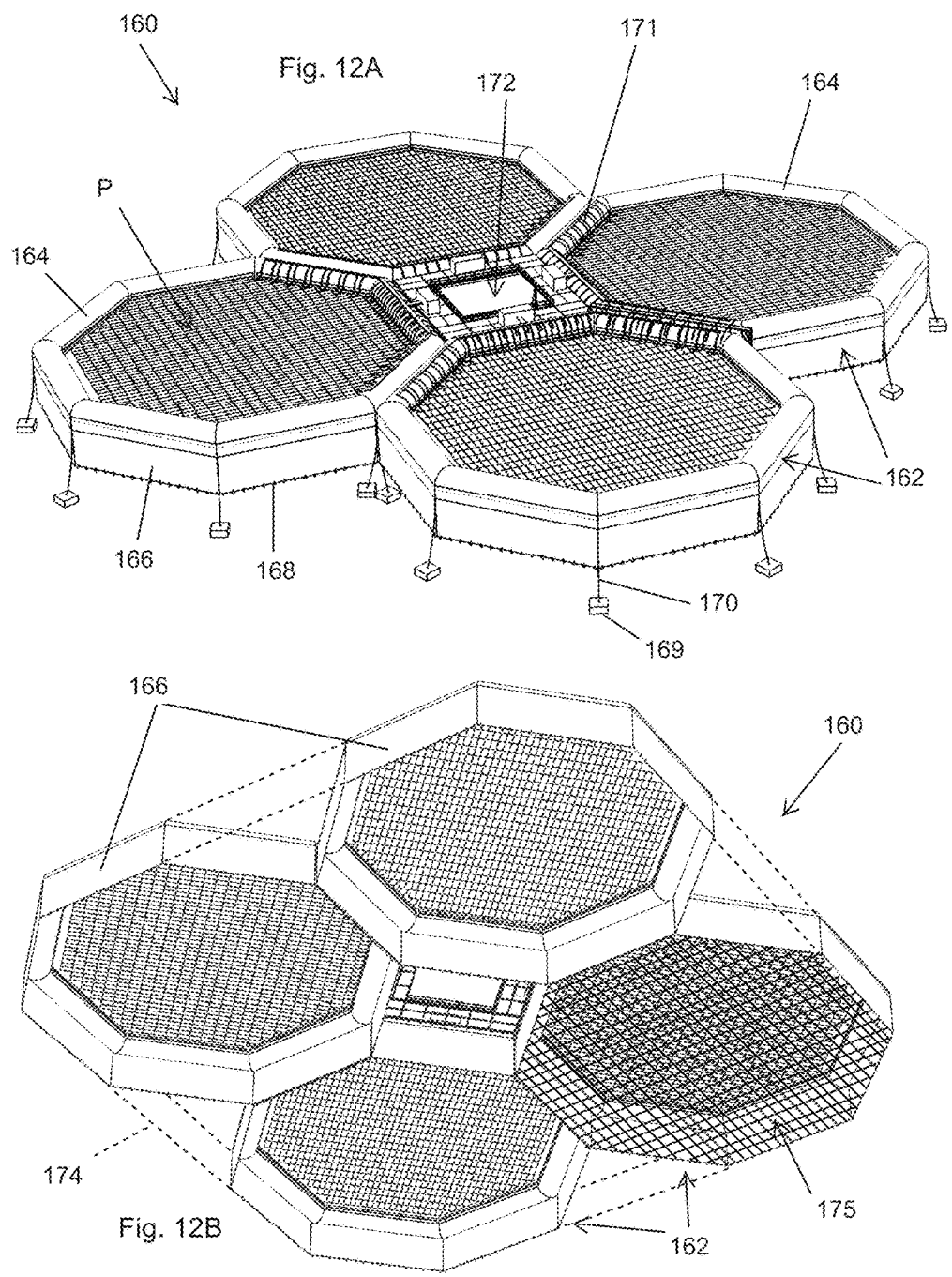

FLOATING SOLAR PANEL ARRAY WITH ONE-AXIS TRACKING SYSTEM

RELATED APPLICATIONS

The present application claims priority under 35 U.S.C. 119 to U.S. Provisional Application No. 62/339,844, filed May 21, 2016, and to U.S. Provisional Application No. 62/200,420, filed Aug. 3, 2015.

FIELD OF THE INVENTION

The present application pertains to photovoltaic systems and, more particularly, to a system of floating solar panels with a one-axis tracking system to cause the panels to face the sun at all times.

BACKGROUND OF THE INVENTION

During the next decades, the generation of sustainable energy will become one of the main challenges of our civilization. Worldwide energy demand is expected to grow from about 10 GTep ($10^{10}$ Tep [Ton Equivalent Petrol], or $5*10^{19}$ Joule) in the beginning of the century to 15-20 GTep by 2050. Some scenarios predict even levels as high as 40 GTep. An analysis of future global petrochemical consumption needs (i.e. energy needs and/or raw material for chemical industry) implies that early petrol shortages might already appear in the mid of the century. The need for large scale renewable energy sources is underlined by the global warming due to increasing $CO_2$ levels which is a by-product of the energy generation process using any kind of fossil fuel.

These predictions have stimulated rapid growth in the development of renewable energy. Wind farms, hydroelectric power plants, thermal power stations, and solar power plants all need a certain area of land, which is costly and can negatively affect the environment.

Solar energy is a clean and inexhaustible natural resource and one of the most promising renewable energy. An estimated 10,000 GTep of solar radiation reaches the earth every year, while perhaps only 5 GTep of usable solar power would be needed to make a significant step toward global energy sustainability. However, for solar power plants to offer the same generating capacity and supply stability as traditional power plants, the required land area is enormous.

In order to efficiently use the available surface area, therefore, solar power could be moved to lakes or oceans, improving the utilization of land while preserving human living space and land for agriculture. Consequently, floating solar arrays have generated great interest in recent years. One discussion of this technology appears in "Solar Islands: A new concept for low-cost solar energy at very large scale," posted by Francois Cellier on May 20, 2008 in The Oil Drum: Europe (http://europe.theoildrum.com/node/4002). Other designs appear in the patent databases, such as in U.S. Pat. Nos. 4,350,143; 7,063,036; 7,891,351; 8,176,868; and 8,183,457; and in U.S. Patent Publication Nos. 2007/0283999; 2008/0257398; 2009/0314926; 2011/0291417; 2012/0305051; 2013/0146127; and 2014/0034110.

Despite much study, there remains a need for a floating photovoltaic system which can overcome certain problems encountered in the prior art.

SUMMARY OF THE INVENTION

This application presents a floating array of solar photovoltaic panels with a one-axis tracking system to cause the panels to face the sun at all times.

In one embodiment, a floating array of photovoltaic panels is made of a closed loop of flexible pipes (typically in high density polyethylene or polypropylene). The loop consists of several parallel rows in the direction of the panels, connected by pipe sections perpendicular to the rows in order to a closed loop of pipes.

The number of lines of polyethylene pipes to support the solar panels does not need to be the same as the number of rows of solar panels; the panels are supported by rails, mounted on bars making a triangular shape, and supported on a horizontal bar going across in the perpendicular direction of the pipes. The array resist to the wind blowing at the back of the panels thanks to an anti-lift system made by one or several membranes (also called geo-membranes) attached (typically glued) below one or several sections of pipes and submerged with water.

In one embodiment, the floating array has a rectangular or square shape. In another embodiment, the floating array is made of several arrays with a rectangular or square shape, connected together with T fittings to approximate an overall circular shape of the array. In another embodiment, the array could have a polygonal shape using 45° or 60° fittings.

Typically for application over the sea or the ocean, a stabilizing skirt downwardly-depending from the border of the floating array can surround a column of water underneath the array of photovoltaic panels, wherein the stabilizing skirt is rigidified with interconnected horizontal and vertical tubes made of a material having a higher density than water, to remain substantially vertical in the water and forming a barrier around the column of water so as to create a more stable volume of water within the peripheral shape that outside of the floating array.

The floating array can be equipped with a sun tracking system around a vertical axis, using winch type systems (typically windlasses), each connected to a mooring line. The winches are typically installed at the corners of the floating array (a corner being defined by the intersection of two perpendicular pipe sections). In one embodiment, four mooring lines are connected to only two anchors or dead weights, and the rotation of the array is limited to ±60° around its middle position.

In one configuration, the mooring lines are made by a nylon rope connected to a chain. In conventional mooring line configurations, the chain is connected to an anchor and the rope is this connected to the other extremity of the chain. For our application, the rope is connected to an anchor (or to a dead weight), and the chain is thus connected to the other extremity of the rope. The chain is thus at "the top of the mooring line", which is the opposite of that in a conventional mooring line.

Several arrays can be connected together, using a unique tracking system for all of these arrays. The arrays connected together form an alignment of arrays. The connection between the arrays is made by an underwater pipe or an underwater bar with a similar density as the water upon which the arrays are floating. These arrays are moved around a vertical axis using winch type systems (typically windlasses), each of them connected to a mooring line. In one embodiment, four mooring lines are connected to only two anchors or dead weights. The winches are installed on the first and on the last floating arrays in the alignment of arrays. The winches are typically installed on two corners of the first and last arrays. For small lakes or mine tailing, the two anchor points will be onshore, on a concrete foundation. Winches to wind and unwind the mooring lines are located at the anchor point or on the solar array. For larger water areas, or offshore applications in the sea water, the anchor points are under water; using typically a concrete block or a suction pile solution for each anchor.

One object of the present application is to provide a floating array of photovoltaic panels made of parallel lines of flexible pipes (typically in high density polyethylene or polypropylene), forming a closed loop thanks to connections by electro-welded or thermo-welded fittings. The pipe connections include elbows at the corner junction of two pipes and T-fittings at the junction of three pipes. The floating array of photovoltaic panels preferably has a square shape, a rectangular shape, or a polygonal shape. The floating array of photovoltaic panels may be made of an assembly of rectangular or polygonal sub arrays to form a shape approaching a circle. Desirably, aluminum or metallic frames (typically angle bars or tubes) in a non-parallel direction to the lines of pipes are connected to the pipes with several collets and side rods, and mechanically hold several solar panels connected together with a triangle and a rail-type system.

In one embodiment, the floating array has an anti-lift membrane in polyethylene or polypropylene (also called geo-membrane) attached (typically with glue) below one or several sections (typically rectangular sections) of the array (typically below the last and the front row of panels), that stays underwater to act an anti-lift system for the panels. One aspect includes a stabilizing skirt downwardly-depending from the border of the array to surround a column of water underneath the array of photovoltaic panels, wherein the stabilizing skirt is rigidified with interconnected horizontal and vertical tubes made of a material having a higher density than water, to remain substantially vertical in the water and form a barrier around the column of water so as to create a more stable volume of water within the peripheral shape than outside of the floating array. The anti-lift membrane and/or the stabilizing skirt may have surfaces in contact with the water that are covered with a layer of Tedlar® for anti-fouling protection.

A tracking system may be used to follow the sun during the day, around a vertical axis using winch type systems (typically windlasses) installed at the corners of the floating array (the corners being defined by the intersection of non-parallel pipe sections). The tracking system may use only two anchor points and four mooring lines each connected to a winch, where the mooring lines are made of rope or textile material in their bottom part, and of chain in their upper part. A sensor may be installed on the tracking system of the float to measure the variations of water level.

Several floating arrays for photovoltaic panels aggregated together in an alignment of arrays may be connected together by underwater pipes or bars with a density similar to water density. Several floating arrays for photovoltaic panels may utilize a sun-tracking system with two winch type systems (typically windlasses) installed at the corners of the first floating array of the alignment, and two winch type systems installed at the corners of the last floating array of the alignment. In one system, several floating arrays coupled together may use only two anchor points and four mooring lines connected to the winches to follow the sun during the day.

A floating array of photovoltaic panels to be used on canals or rivers is disclosed, made of parallel pipe sections of polyethylene, plugged at their extremities, with aluminum or metallic frames (typically angle bars or tubes) in a non-parallel direction to the lines of panels on top of this array, connected to the pipe sections with several collets and side rods, and mechanically holding several solar panels connected together with a rail-type system.

BRIEF DESCRIPTION OF THE DRAWINGS

Features and advantages of the present invention will become appreciated as the same become better understood with reference to the specification, claims, and appended drawings wherein:

FIGS. 2A-2F are various perspective views of enlarged areas of the arrays of floating solar panel array shown in FIG. 1A;

FIGS. 3A-3F are detailed views of a preferred construction of a buoy and panel support structure for the array of floating solar panels;

FIGS. 4A-4H depict an alternative construction of a buoy and panel support structure for the array of floating solar panels;

FIGS. 7A-7M are various perspective and close-up views of an exemplary stabilizing skirt formed of a frame of tubular members and vertical panels;

FIG. 8 schematically shows a rectangular floating solar array with mooring lines connected to four corners, and FIG. 8A is a close-up of one corner showing a motorized windlass thereon;

FIGS. 9A-9E depict an array of floating solar panels with a rotational tracking system having four winches, four mooring lines and two anchors and showing progressive movement during the day to maintain the solar panels facing the sun, with a rotation of the array limited to ±60° around its middle position, and FIGS. 10A-10E show the same rotational movement for a plurality of linked arrays;

FIGS. 11A-11D illustrate a rotational tracking system showing two anchors on opposite shores of a lake created behind a dam;

FIGS. 12A and 12B are top and bottom perspective views of multiple floating solar systems aggregated into a cluster.

DETAILED DESCRIPTION OF THE PREFERRED EMBODIMENTS

The present application discloses an or several arrays of floating solar panels with a one-axis tracking system to cause the panels to face the sun at all times of the day. The solar panels are mounted over a series of connected rows and columns of buoyant flexible pipes forming a buoyant closed loop shape around an outer periphery.

Figure 1A:
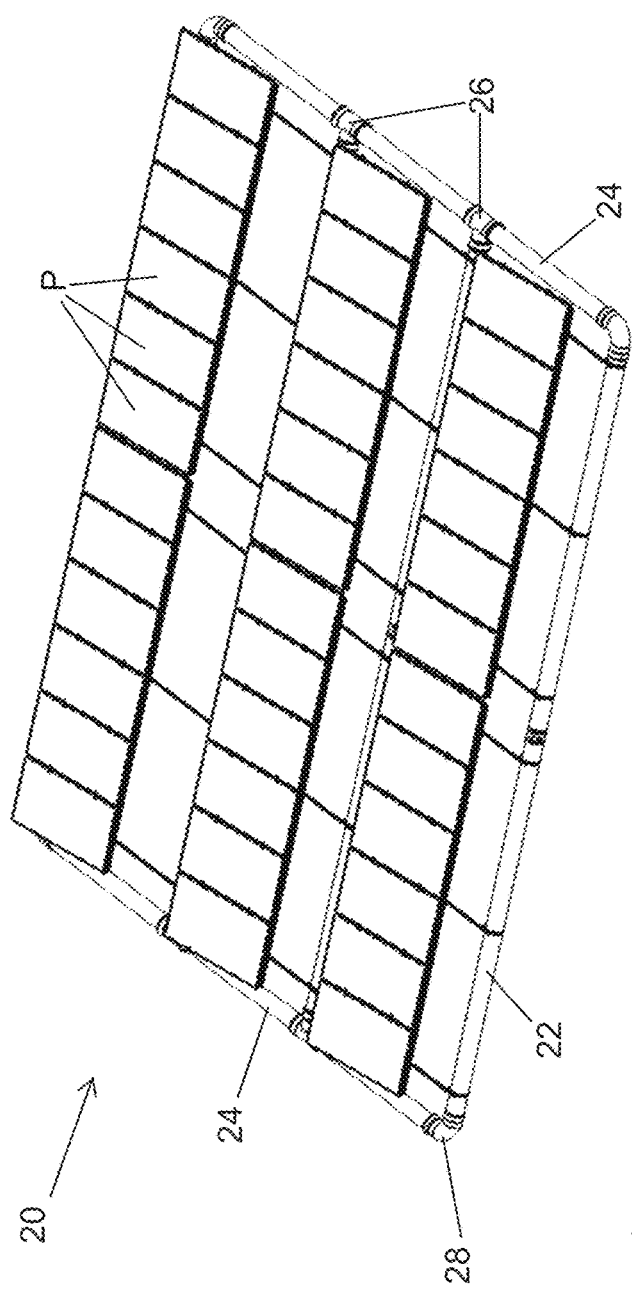
FIG. 1A is a perspective view of a 3×12 array of solar panels mounted on tubular floats.
Figure 1B:
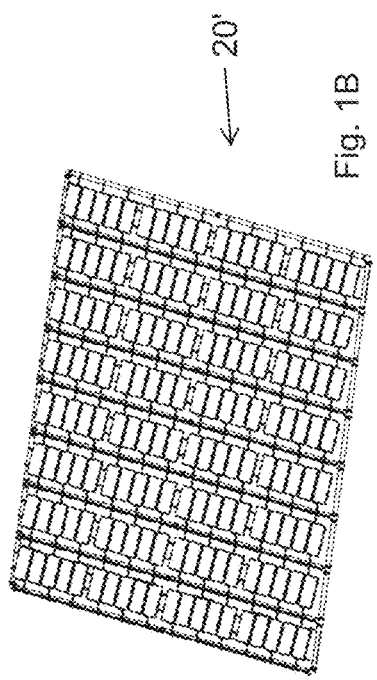
FIG. 1B is a larger array.

The arrays of floating solar photovoltaic panels may be utilized on lakes, water dams, mine tailings or other water reservoirs. The arrays may also later be deployed on the sea water in calm areas. The panels are installed by floating arrays composed of a large number of panels, typically around 1,000 panels. Each array is made of parallel lines of flexible pipes, making a closed loop shape on an outer periphery of flexible pipes. The flexible pipes are connected by electro-welded or thermo-welded fittings with elbow connections at corner junctions of two pipes and T-fittings at junctions of three pipes, as will be seen. Each array is holding several lines of photovoltaic panels. For instance, FIG. 1A is a perspective view of a large array 20 of solar panels P mounted on tubular floats. Several floating arrays may be connected together by a tube or a bar with a similar density as the water upon which they are floating, thus forming a line of arrays. The array 20 illustrated in FIG. 1A has 36 total panels P in three rows of twelve panels each. FIG. 1B shows a rectangular array 20' having 160 panels P in eight rows of twenty panels each; separated in each row in four groups of five.

Figure 1C:
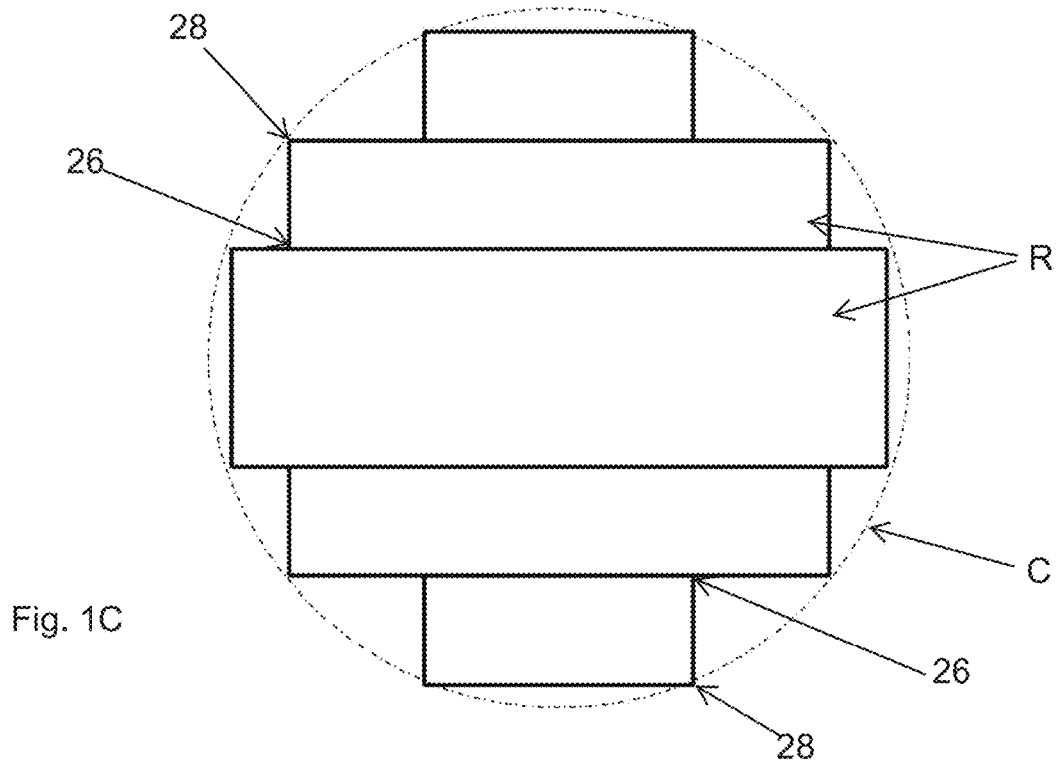
FIG. 1C schematically shows a closely packed plurality of rectangles representing rows of solar panels closely packed within a circular periphery.
Figure 1D:
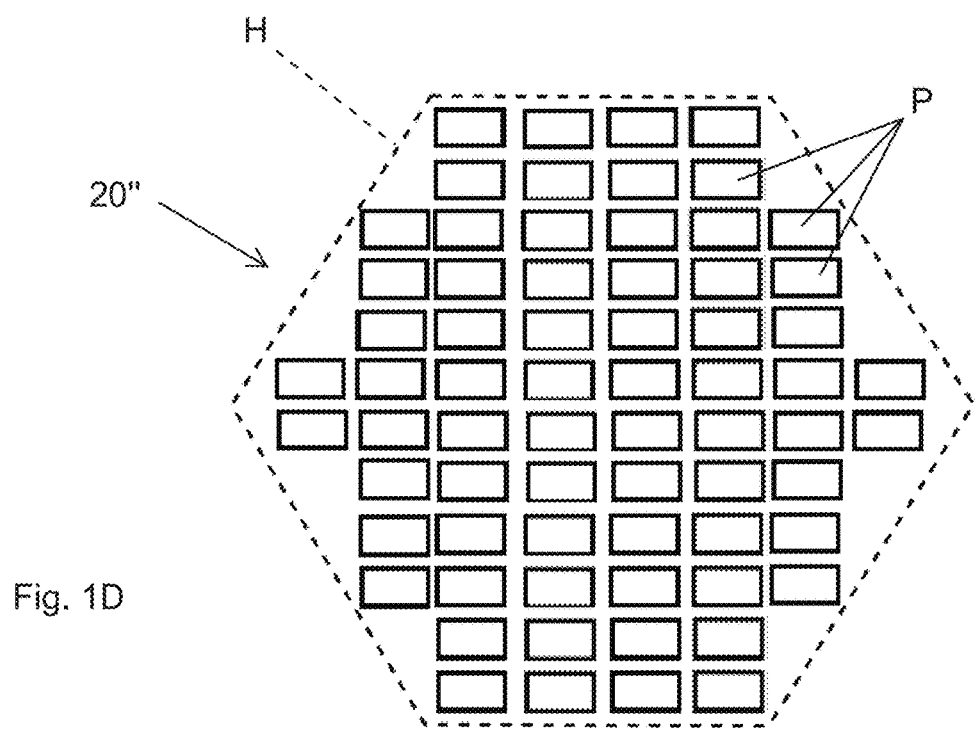
FIG. 1D shows rows of solar panels closely packed within a hexagonal periphery.

Of course, there are numerous other arrangements of panel arrays with less than 36, more than 160 individual panels, or somewhere in between. The float can have a polygonal form, typically a square or a rectangle. Additionally, an assembly of rectangular or polygonal sub arrays may be joined such that the closed loop shape approaches a circle. For instance, FIG. 1C shows a number of differently sized rectangles R closely packed within the outline of a circle C, which schematically represents rectangular arrays of panels closely grouped into a circular outer periphery. FIG. 1D shows an array 20" of panels P in another arrangement, with multiple rows of panels having either 4, 6 or 8 panels each. The aggregate fits closely within an outer hexagonal periphery H, representing an outer frame of buoys, which facilitates rotation of the array about a central vertical axis.

Figure 2C:
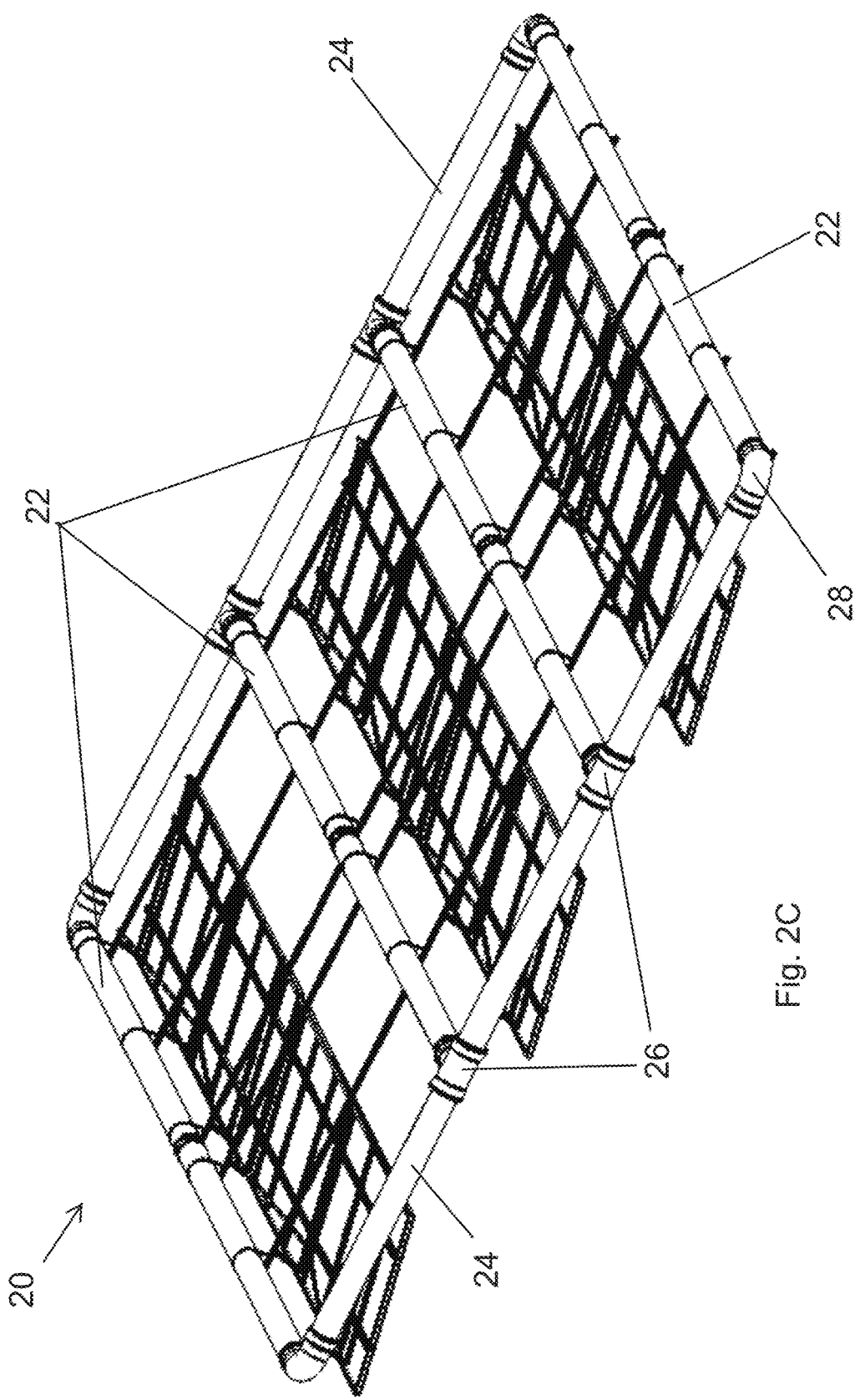
Figure 2D:
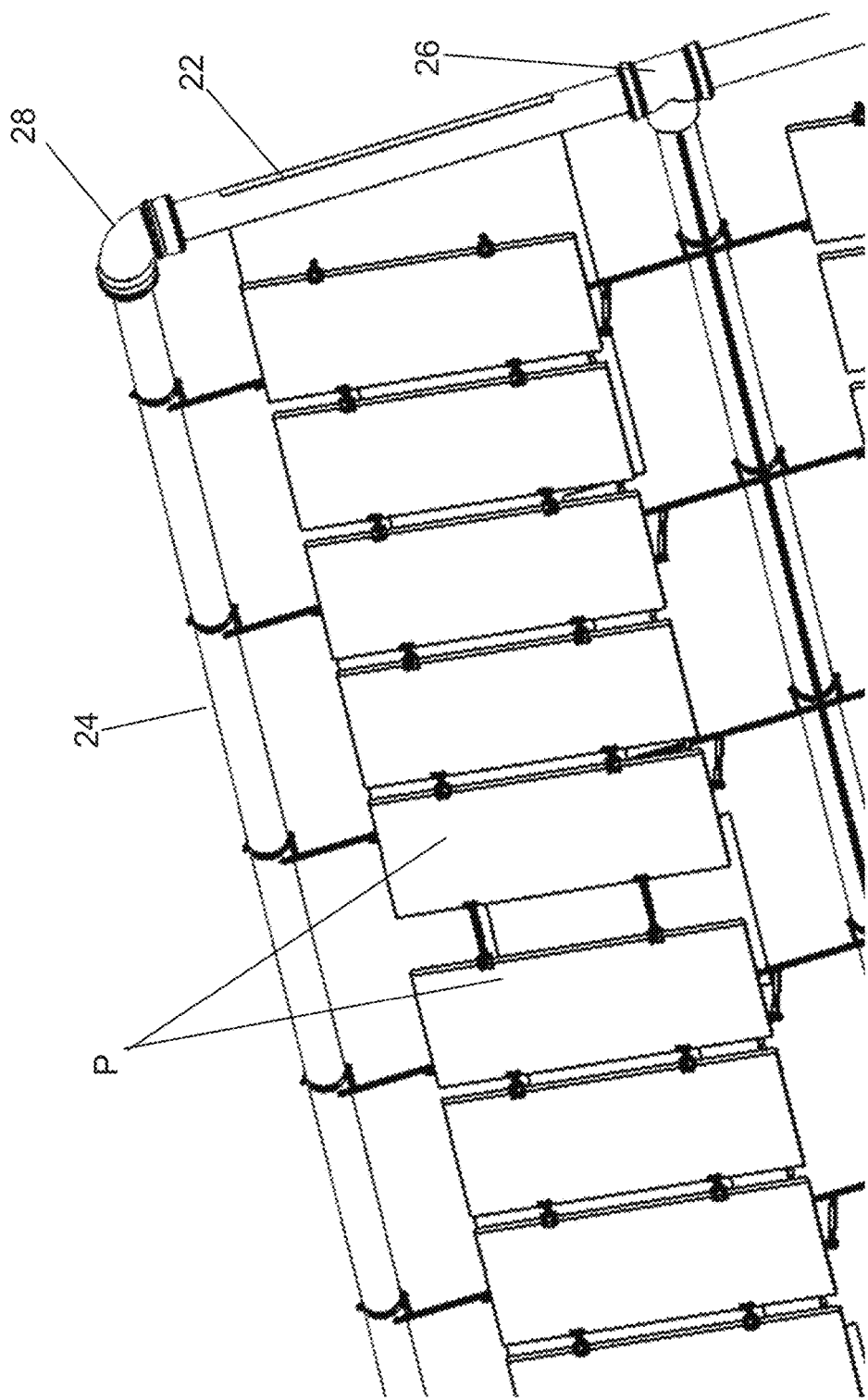

FIGS. 1A and 2A-2F are various perspective views of enlarged areas of the exemplary array of floating solar panels P of the present application. With particular reference to FIGS. 1 and 2A, the float consists of rows of first pipes 22 assembled together with columns of second pipes 24 on the ends of the rows. The first pipes 22 extend under and in parallel with the rows of solar panels, and the columns of second pipes 24 extend in the perpendicular direction. As will be explained below, each of the first and second pipes are typically formed of hollow tubes of high density polyethylene. For the sake of reference, the direction in which the panels P and first pipes 22 are arranged in rows will be termed the lateral direction, while the perpendicular direction aligned with the columns of second pipes 24 is the longitudinal direction.

To form a closed loop polygon (typically a square or a rectangle), the linear sections of the pipes 22, 24 are assembled together with T-shaped and right angle corner electro-welded fittings 26, 28, as best seen in FIG. 2C. The T-connections 26 and corner elbows 28 joining the rows and columns of pipes 20 are also preferably high density polyethylene. The pipes 22, 24 are desirably 200 mm or more in diameter. FIG. 1D also illustrates the numerous conjoined rectangles that may be assembled using the segments of pipes 22, 24 and various T-connections 26 and corner elbows 28 as needed. The electro-welded or thermo-welded elbow connections and T-fittings join the flexible pipes to form an array of buoyant structures that support the solar panels P above the host water surface.

As will be explained in more detail below, each panel P is supported on the arrays through a metallic bar and a triangle to give the panels a fixed inclination angle. Of course, an arrangement whereby the inclination angle of the panels P is adjustable may also be provided.

The solar array 20 also includes a plurality of electrical cables (not shown) interconnecting the photovoltaic panels P. In a preferred embodiment, the cables attach generally to one side of the solar array 20, such as at the terminal end of the rows of photovoltaic panels P in the array. In this manner, a complete circuit is formed through all of the photovoltaic panels P in each of the rows. Parallel connecting cables (not shown) are then used to combine the power generated by the panel rows, which can then be routed to a power converter, as is known. Electrical cables desirably run alongside structural cables so as not to bear any significant weight.

Figure 3A:
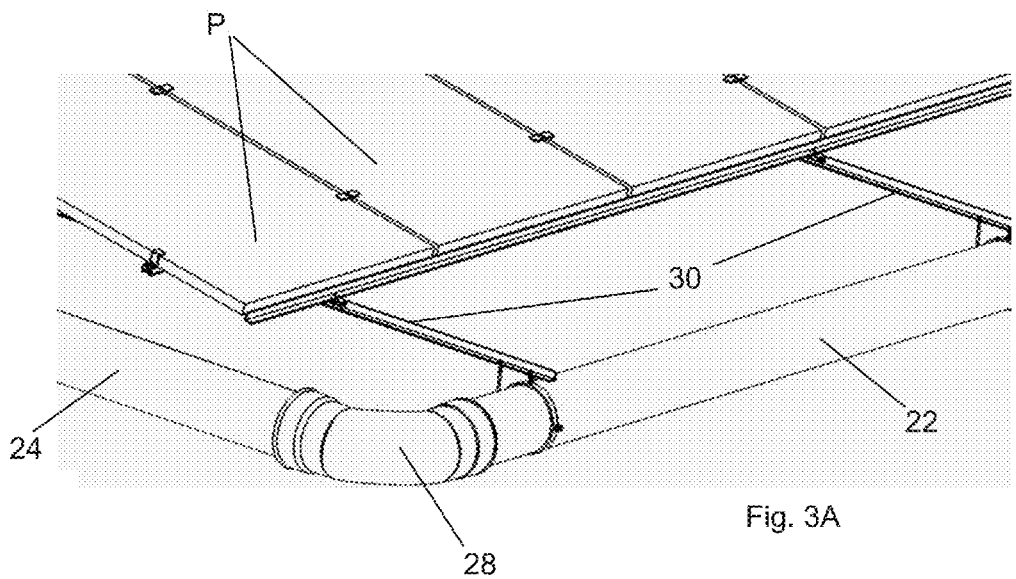

Solar Panel Support Structure:

The panels P are supported by a plurality of horizontal bars 30, preferably angle shaped, fixed above the pipes 20. FIGS. 3A-3F are detailed views of a preferred construction of the array of floating solar panels. With particular reference to FIGS. 3A-3D, each of the first pipes 22 has a plurality of circular collars 32 secured at intervals. Short vertical linking spars 33 extend upward from the collars 32 and are fastened securely to points along the horizontal bars 30. As best seen in FIGS. 3E and 3F, a series of triangular frames are fastened above the horizontal bars 30 comprising an angled support spar 34 on either side of each solar panel P forming a hypotenuse of the triangle, and a short vertical leg 35. The triangular frames prop the panels up at a preferred inclination angle to better face the sun. The preferred inclination angle may be between 5-45°. In addition, a laterally-oriented angled spar 38 desirably rigidly connects to (or near) the lower end of each vertical leg 35 to (or near) the upper end of the adjacent vertical leg, as seen in FIG. 3E. This helps resist lateral movement of the upper ends of the panels P.

Figure 3B:
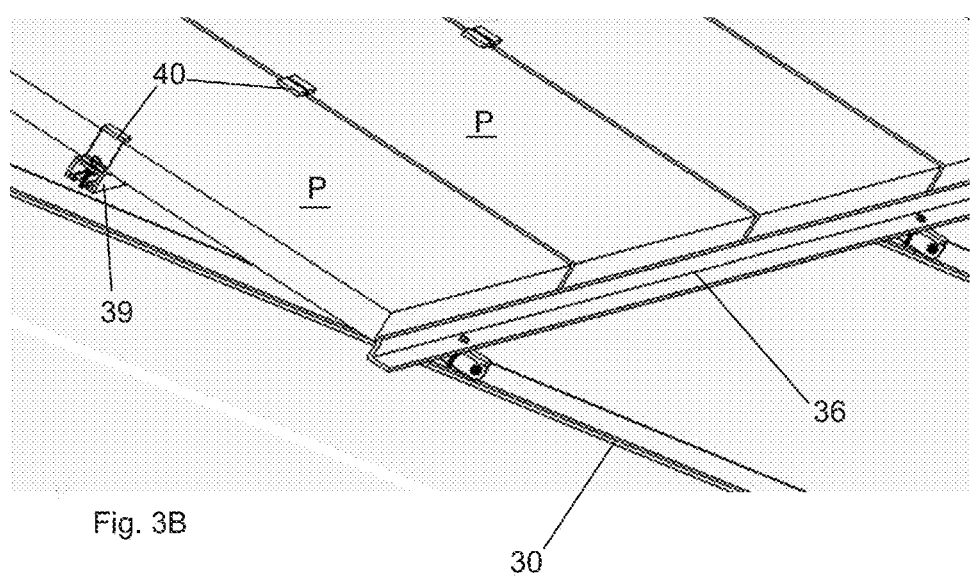
Figure 3C:
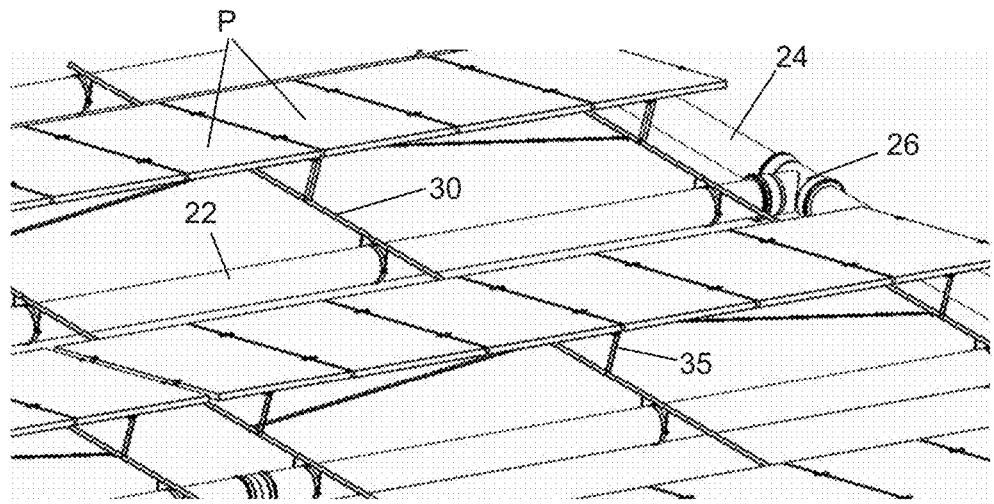
Figure 3D:
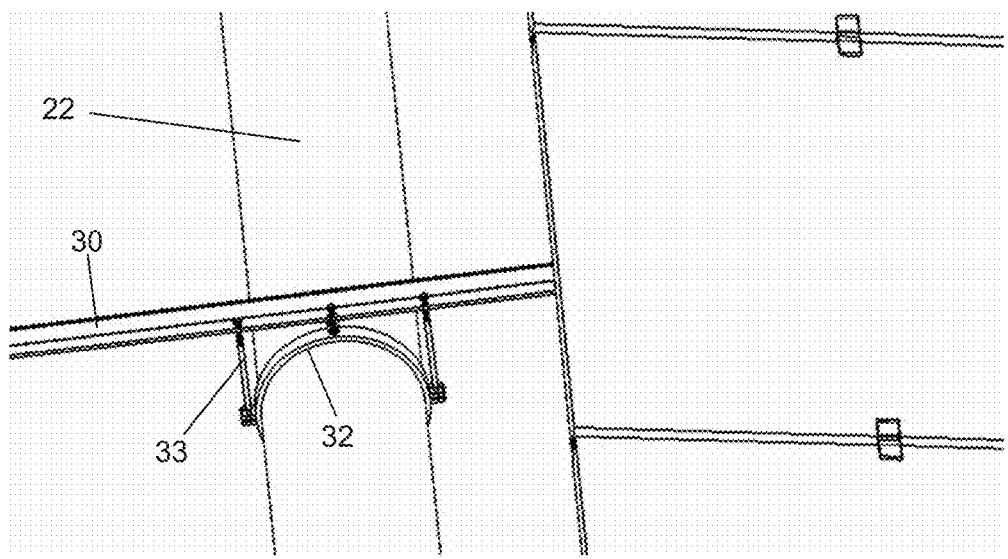
Figure 3F:
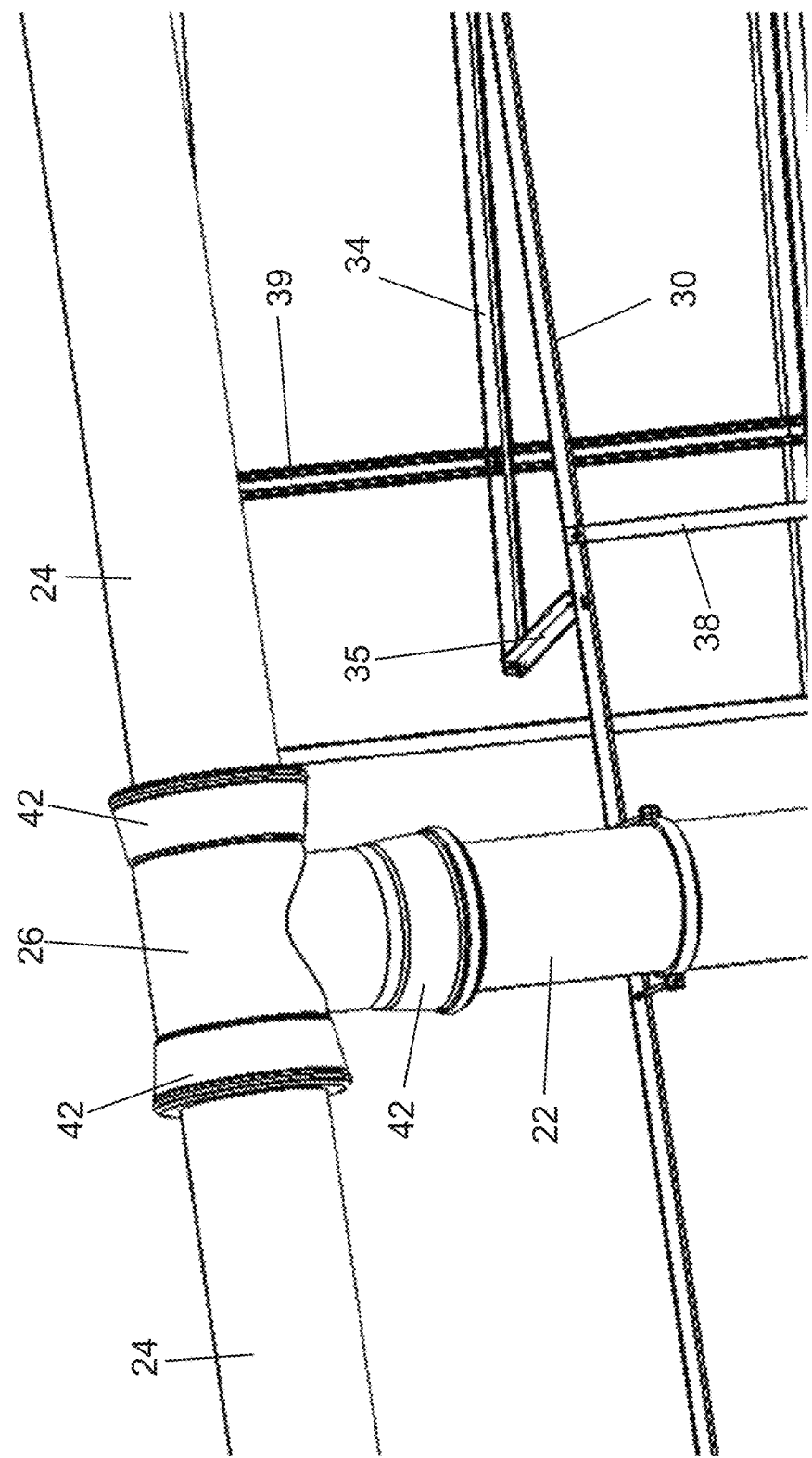

With particular reference to FIG. 3B, a horizontal angle shaped bar 36 is secured along a lower edge of a plurality of panels P to prevent the panels from sliding down the incline. To further support the panels P, a plurality of channel-shaped bars 39 extend underneath a row or segment of a row of panels and are secured to lateral edges thereof via a plurality of small clamp members 40. This helps maintain the panels P aligned and spaced properly.

Finally with reference to FIG. 3F, a preferred T-shaped connector 26 is shown along with some of the aforementioned support structure. The connector 26 includes three flared and reinforced ends 42 which snugly receive the free ends of the pipe segments 22, 24. The connection between the pipes 22, 24 and connector 26 is by electro-welding or thermo-fusion welding, and is desirably done to high-quality to avoid leaks.

It should be noted that the support structure for the panels P including the various bars and spars is desirably formed of a metal which is relatively corrosion resistant, such as stainless steel. To save on weight and expense, aluminum may also be used. It is also conceivable that the support structure is made of a polymer, though given that most of the flexing loads is absorbed by the support structure this may result in a shorter life for the entire array. The various spars and connecting members are desirably formed as angle members, I-beams or channels to increase stiffness while minimizing weight.

Figure 2E:
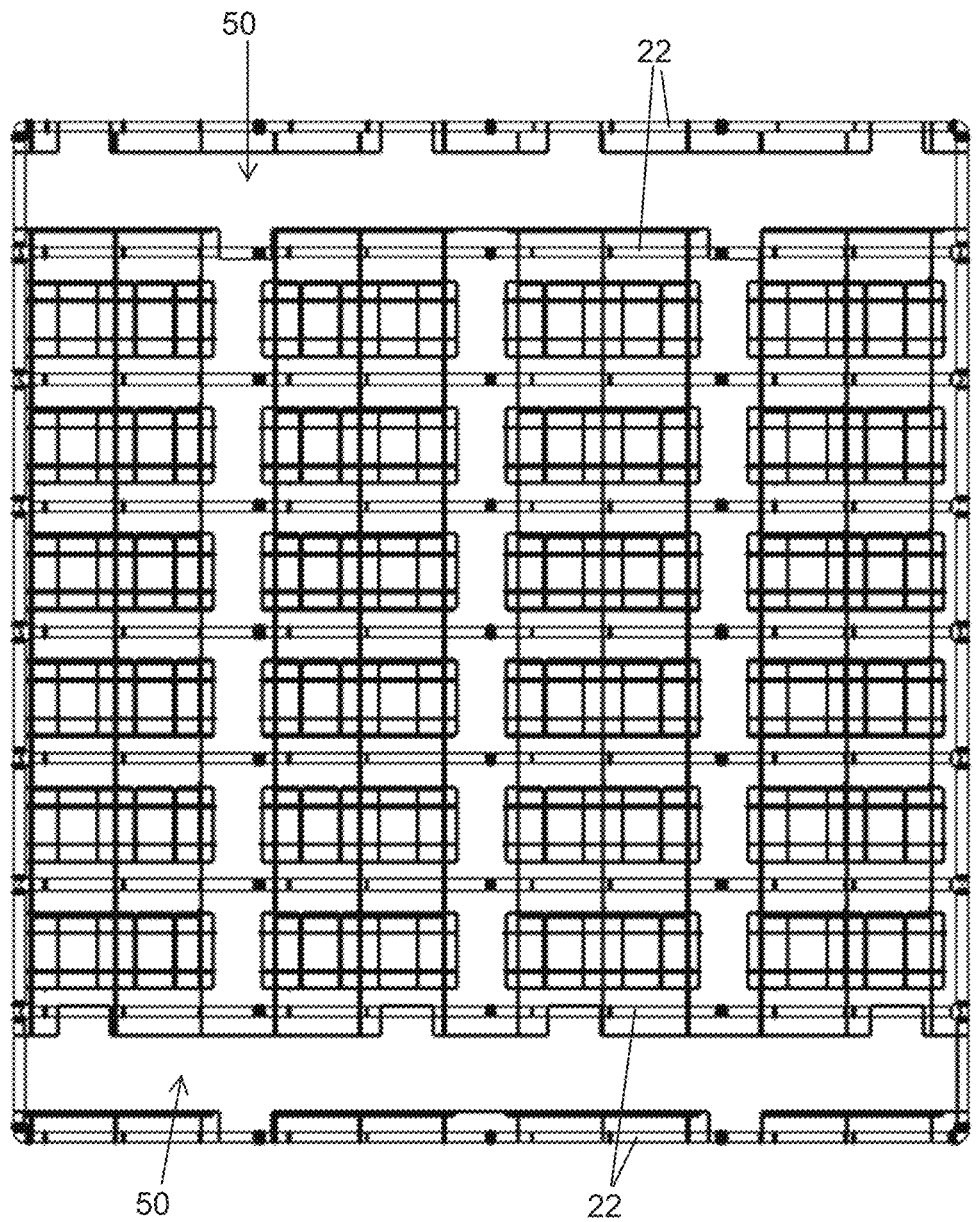

Anti-Lift Membranes:

To resist high wind velocities or large gusts of wind, one or more drag or anti-lift members are provided on outer ends of the array 20. For example, a geo-membrane 50 (termed an anti-lift membrane for the present application) in polyethylene, polypropylene or EPDM (Ethylene Propylene Diene Monomer rubber) is attached (typically glued but also may be secured with fasteners such as rivets) below one or several sections of the floating array. With particular reference to FIGS. 2E and 2F, the anti-lift membrane 50 is glued below the first and last rows of panels P, and stays underwater to act as an anti-lift system for the panels. The membranes 50 are preferably connected to the first and second pipes 22, 24.

In a preferred embodiment, as seen in FIG. 2F, the membranes 50 have a generally rectangular mid-portion 52 that extends between and parallel to the first and second rows of first pipes 22, and a plurality of outward first flaps 54 that extend perpendicular to the mid-portion. The flaps 54 preferably extend over the top of and wrap around the respective first and second rows of first pipes 22, and are secured thereto with adhesive, welding or the like. In a similar manner, a pair of the flaps 56 extend over and wrap around the two perpendicular second pipes 24 and are secured thereto in the same way. The membranes 50 are desirably made of polyethylene having a thickness of between about 1-2 mm. Because of the area of the membrane 50, and the spaces between the flaps 54, 56, the mid-portion 52 tends to droop down such that water collects on top of it. This provides a self-filling ballast which tends to resist lifting forces from high velocity or sudden gusts of wind. Of course, the particular shape of the membranes 50 may be altered, with more rounded edges or more or less connecting flaps. One beneficial aspect is the relatively low cost and weight of the membranes 50 out of the water. They "fill" with water once the array 20 is floating, which provides the ballast needed to prevent lift, and act somewhat like underwater sails. On the other hand, they are relatively shallow and don't overly hinder the ability to rotate the entire array 20.

Figure 4A:
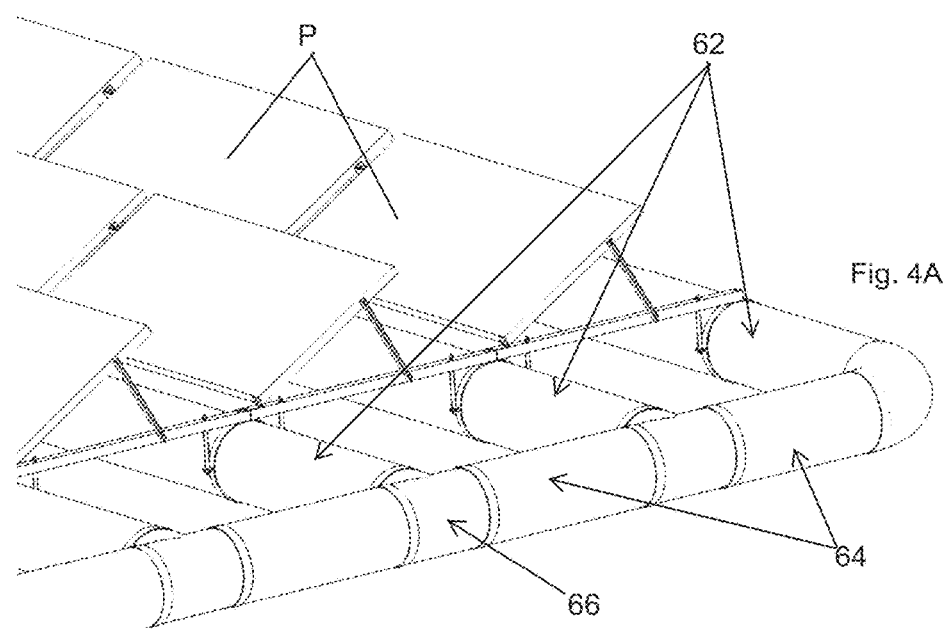
Figure 4B:
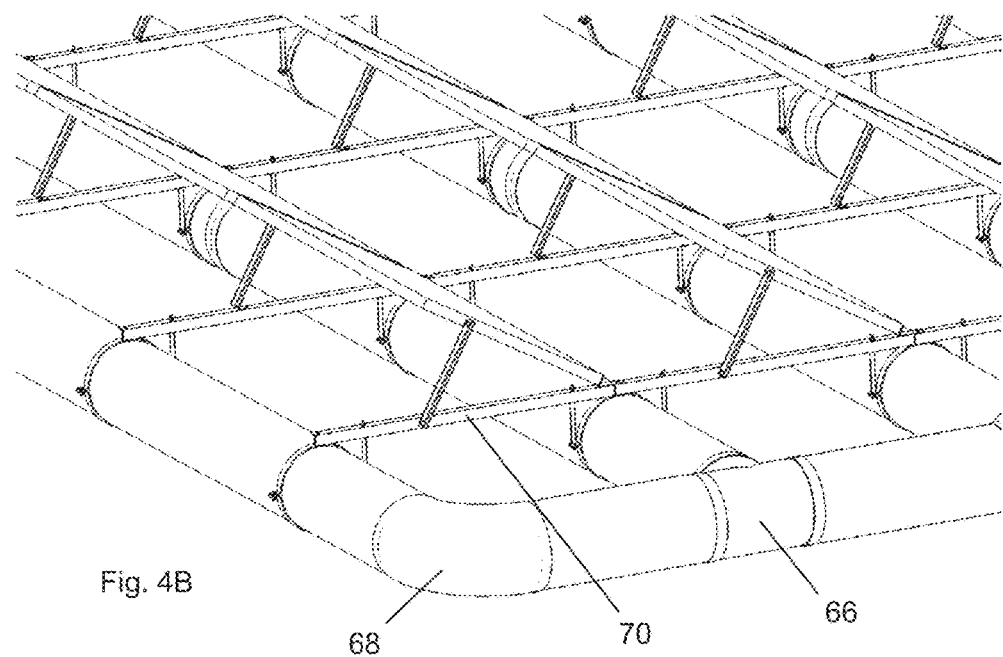
Figure 4E:
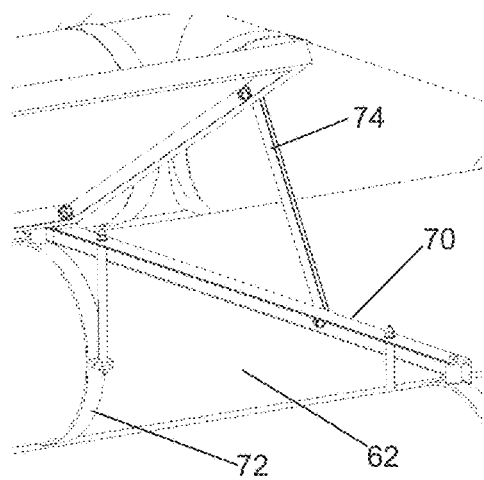
Figure 4F:
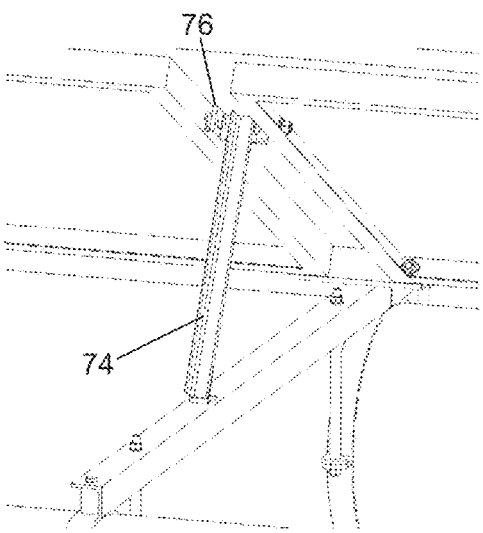
Figure 4G:
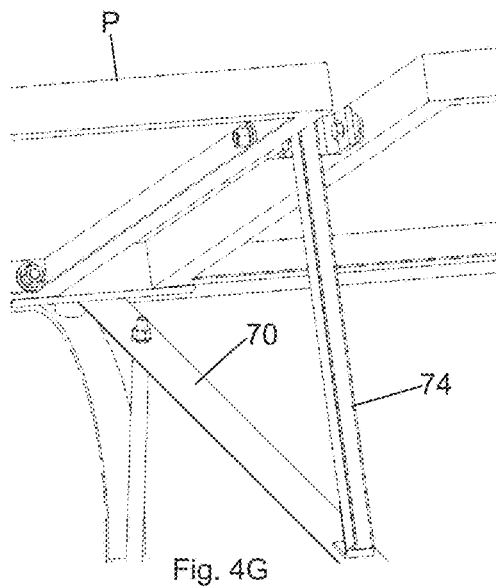
Figure 4H:
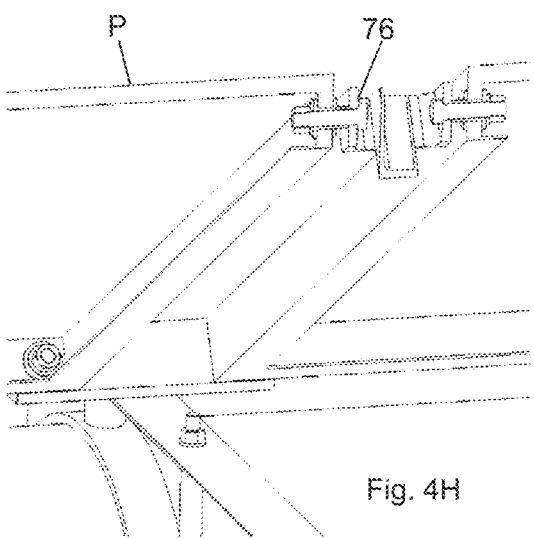

Alternative Support Structure:

FIGS. 4A-4H are various perspective views of an alternative array of floating solar panels P of the present application. With particular reference to FIGS. 4A and 4B, the array consists of rows of first tubes 62 assembled together with columns of second tubes 64 on the ends of the rows, and perhaps one or more in the middle for better support. There is one line or row of first tubes 62 for each row of solar panels P, and preferably one extra. The float can have a polygonal form, typically a square or a rectangle, or be arranged more in a circular fashion as described above. The first tubes 62 extend directly under a front lateral edge of the solar panels P and the second tubes 64 in the perpendicular direction (at the lateral sides of the rectangle) are preferably made of high density polyethylene.

To form a polygon (typically a square or a rectangle), the high density polyethylene lines 60 are assembled together with T-shaped high density polyethylene connections and a pipe The T-connections 66 and corner elbows 68 joining the rows and columns of pipes may be high density polyethylene or polypropylene. Each panel is supported at its bottom on a high density polyethylene tube, and the top of the panel is supported on the next line of pipe through a metallic bar 70 fixed above the pipes. This next line of pipes supports the next line of solar panels, and so on . . . .

FIGS. 4C-4H are detailed views of a preferred construction of a support structure for the array of floating solar panels. With particular reference to FIG. 4C, the pipes 60 are connected to the panels P using a steel collar 72 and the metallic bars 70. An angled support spar 74 on either side of each solar panel P attaches to a metallic bar 70 and props the panel up at a preferred angle to better face the sun. Brackets 76 connect to the top end of each angled support spar 74 and are also attached via fasteners to adjacent edges of the panels P (see FIG. 4F). In this way the panels P are secured at the same angle and even spacing therebetween is maintained. The preferred angle may be between 20-60°, and may also be varied with the addition of a motorized adjustment system, not shown.

Figure 5:
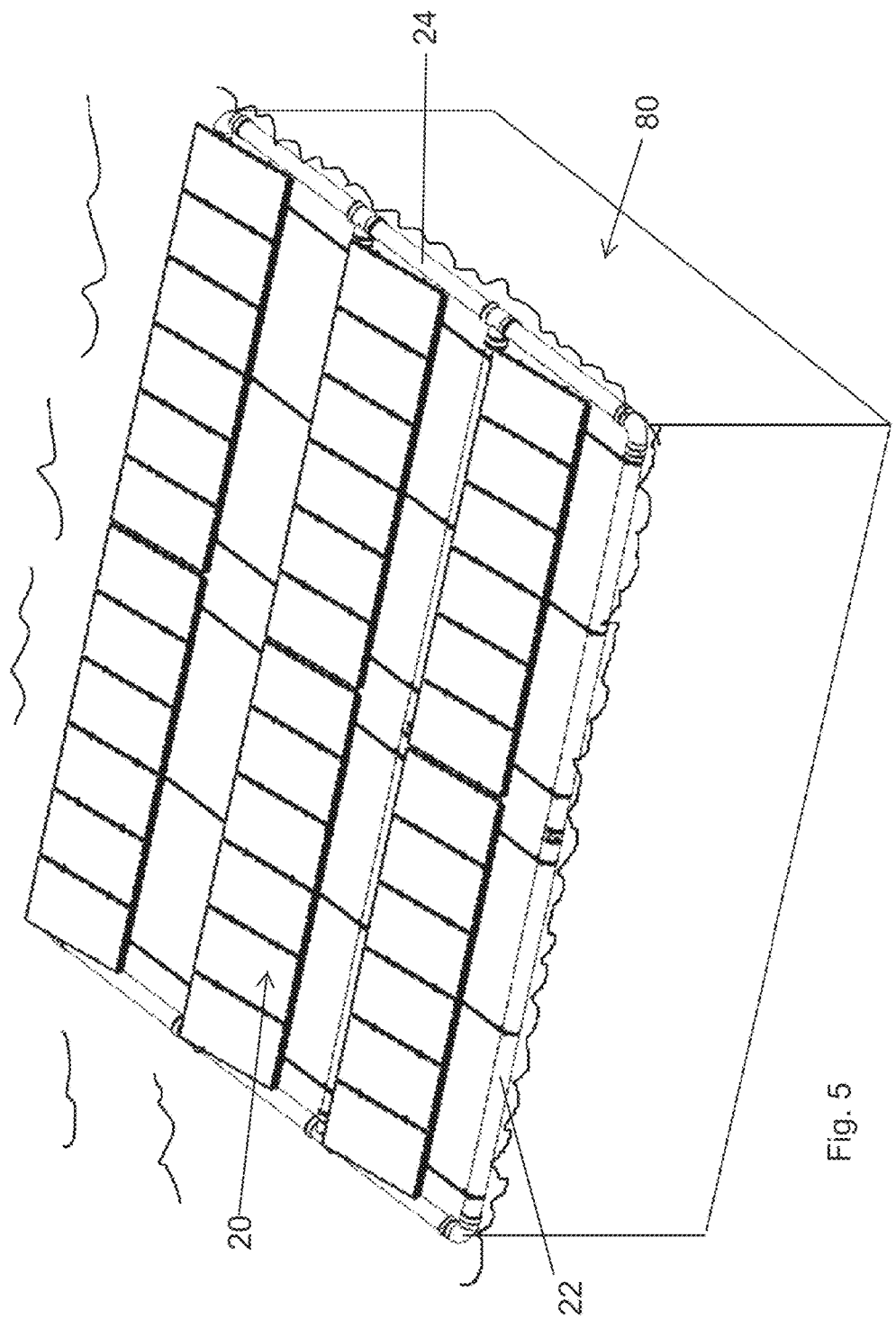
FIG. 5 depicts a floating array with a stabilizing skirt downwardly-depending from the border of the array.

Stabilizing Skirt:

With reference to FIG. 5, a stabilizing skirt 80 may depend downwardly from the border of the array 20 (defined by the outer pipes 22, 24, in this case rectangular) surrounds a column of water underneath the array of photovoltaic panels. The stabilizing skirt 80 is rigidified with interconnected horizontal and vertical tubes made of a material having a higher density than water, to remain substantially vertical in the water and forming a barrier around the column of water so as to create a more stable volume of water within the peripheral shape than outside of the floating array. A stabilizing skirt 80 is particularly useful in rough bodies of water such as in the ocean, but may not be necessary for calmer waters such as lakes or mine tailings. Greater detail about a preferred construction of the stabilizing skirt 80 will be provided below.

Figure 6:
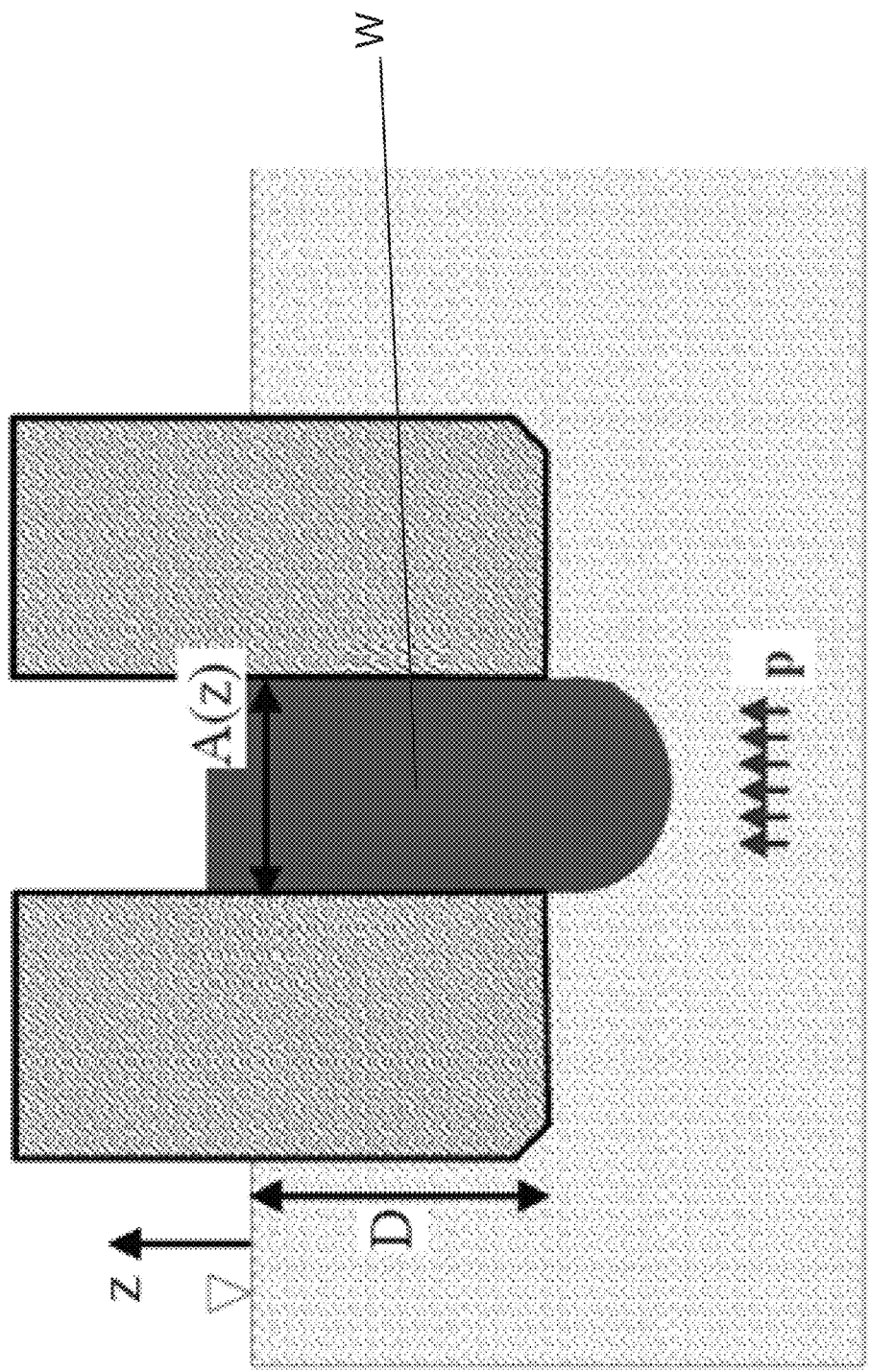
FIG. 6 is a diagram showing the geometry used to define a water column within the floating solar arrays.

With reference now to FIG. 6, a diagram showing the geometry used to define the water column W within the floating solar array 20, sometimes known as a moon pool. The water column W inside the periphery defined by the pipes 22, 24 acts like a column of water independent from the seawater outside the periphery. The resonance period (natural frequency of up-and-down movement) of this column of seawater is determined by its geometry, and therefore by the geometry of the periphery (which creates the column of water). The resonance period of the seawater column W is a function of the length or depth D of the float and the horizontal area A(z) of a section of the column which can vary with the depth z, according to the shape of the surrounding structure. In the exemplary configuration, the shape is defined by the pipes 22, 24 and the skirt 80. The column section A(z) is thus not exactly constant. However, with the dimensions assumed above, it can be considered as a first approximation that the diameter of the seawater column is quasi constant. Under this approximation, the resonance period is roughly:

$$T_0 = \frac{2\pi}{\sqrt{g}} \sqrt{D + \kappa \sqrt{A}}$$

In this formula (also known as Fukuda formula), K is an empirical constant between 0.4 and 0.5. This resonance period can be influenced by the anti-lift membrane which can act thus additionally as a damping device installed in the water column.

The relative water elevation inside the moon pool, also called Response Amplitude Operators of the moon pool, varies thus with wave frequency (noted as T), and for different damping levels.

It is thus seen that the floating solar system array 20 having the peripheral pipes 22, 24 and skirt 80 (and also potentially of an anti-lift membrane used also as a damping device) acts as a wave breaker of the outside waves, drastically reducing their period and their amplitude inside the unit, and thus allowing the photovoltaic panels P to float on a flat sea surface with a very reduced level of wave movement. The floating solar system array 20 must be designed to avoid a situation where the resonance period of the seawater column $T_0$ coincides with the typical period of the sea around the float, called T. When T is close to $T_0$, the waves in the moon pool can become even bigger than the waves outside. The dimensions and the geometry of the floating solar system array 20 (pipes, skirt and net) must therefore be carefully calculated to avoid operation with a seawater period close to the surrounding resonance period. In one embodiment, the skirt 80 has a depth that is between about 10-40% of the width of the closed peripheral shape of the floating solar system 20, and more preferably between about 15-30% of the width.

FIG. 7A-7L are various perspective and close-up views of an exemplary octagonal stabilizing skirt 116 formed of a structural frame or skeleton having struts and vertical panels 120. The octagonal skirt 116 may be used with a floating solar array periphery similar to the hexagonal array shown above in FIG. 1D. As explained above, the skirt is relatively rigid and depends down into the water from the border pipes 22, 24 so as to provide a "moon pool" effect and reduce wave motions inside the floating solar system 20. The skirt 116 is weighted to remain substantially vertical in the water and form a barrier around the column C of water.

Figure 7A:
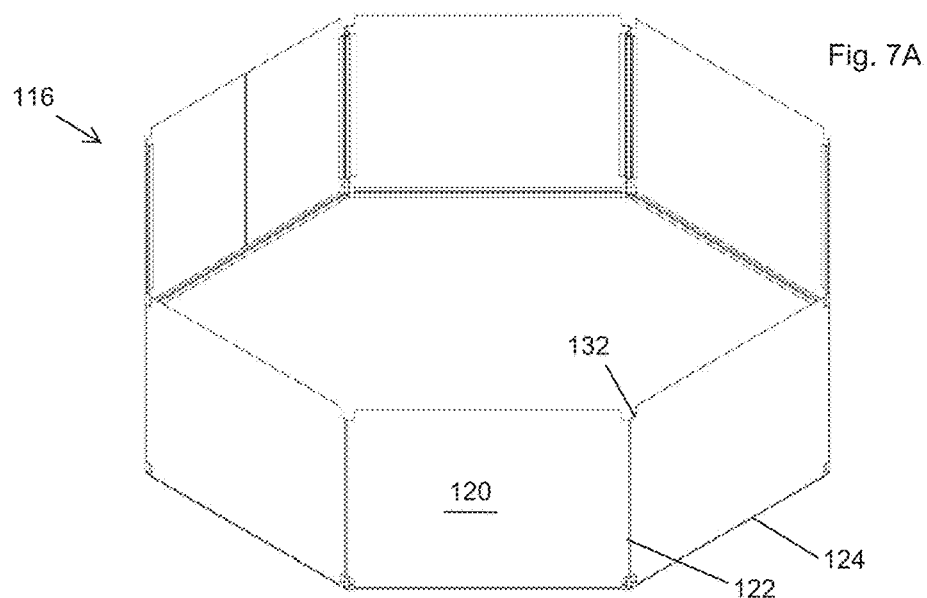
Figure 7B:
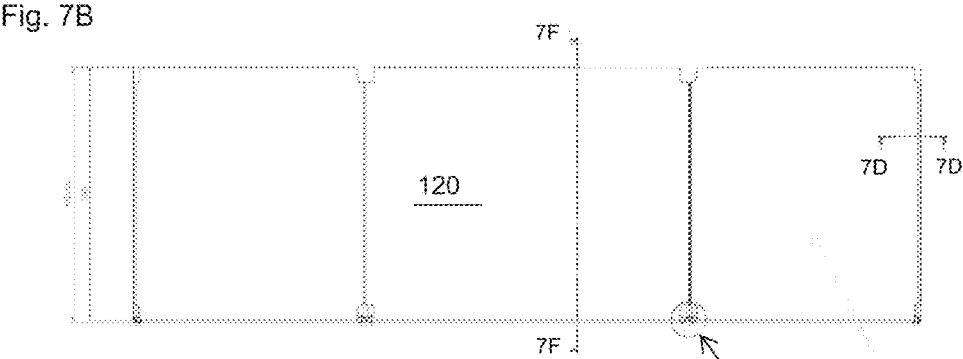

FIG. 7A shows the frame comprising a series of vertically-oriented struts 122 interconnected with a series of lower horizontal fringe struts 124. FIGS. 7B-7E illustrate the vertical panels 120 attached to the frame. In a preferred embodiment, the struts 122, 124 are preferably tubular members, which terms will be used interchangeably hereinafter. The frame will be attached to the underside of the border pipes 22, 24 in a manner such as providing flanges extending down from the pipes to which fasteners are used to connect the skirt. Preferably, the struts 122, 124 are tubes made of stainless steel or inox (a steel alloy with a minimum of 10.5% chromium content by mass), but they could as well be made of any other material resisting to the seawater and with a higher density than the seawater. The vertical panels 120 may also be formed of stainless steel, though they could also be formed of a durable polymer or even fabric that is relatively flexible so that the skirt flexes with wave motion.

In the illustrated embodiment, the border pipes 22, 24 has an octagonal shape, though as mentioned, other shapes are contemplated. In the octagonal form, the frame defines eight vertical sides for the stabilizing skirt 116 and there are eight vertical panels 120. More particularly, the frame includes eight vertices each of which has one of the vertically-oriented struts 122 and a lower horizontal fringe strut 124 connecting the lower ends of each pair of adjacent vertical struts. Eight vertical panels 120 cover the vertical areas within the border created by adjacent vertically-oriented struts 122 and the associated horizontal fringe strut 124. The vertical edges of each panel 120 are fastened either to the adjacent vertically-oriented strut 122 or to the vertical edges of the adjacent panel 120. The result is a substantially solid vertical wall for the stabilizing skirt 116 that creates the calm "moon pool" effect under the border pipes 22, 24.

Figure 7C:
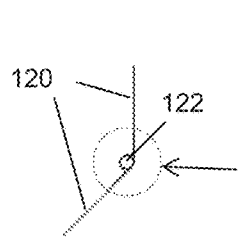
Figure 7D:
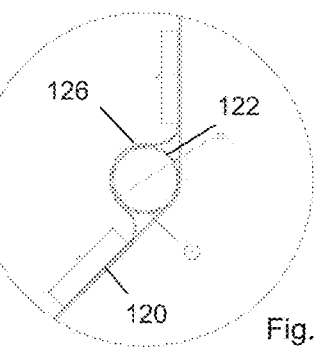

With reference to FIG. 7C and detail of FIG. 7D, a horizontal section through one of the vertices of the stabilizing skirt 116 shows the vertically-oriented strut 122 with adjacent vertical panels 120 secured thereto on the outer side thereof. One or more straps or a thin panel 126 (see FIG. 7L) of flexible material may be secured to the inner faces of each adjacent panel 120 so as to create a pocket for the strut 122.

Figure 7E:
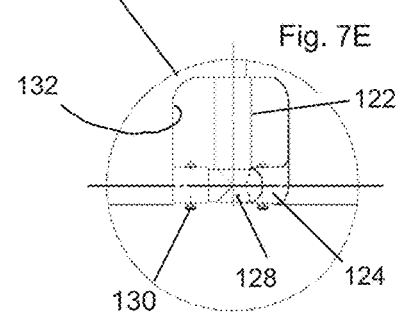
Figure 7K:
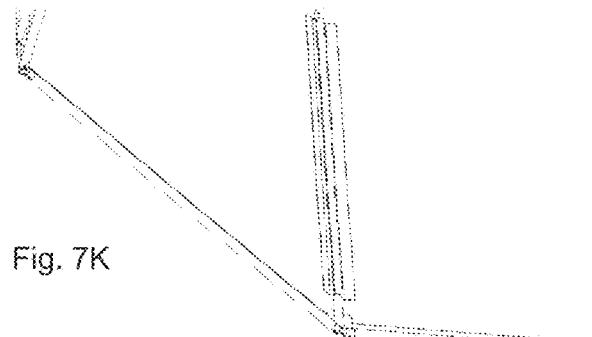
Figure 7L:
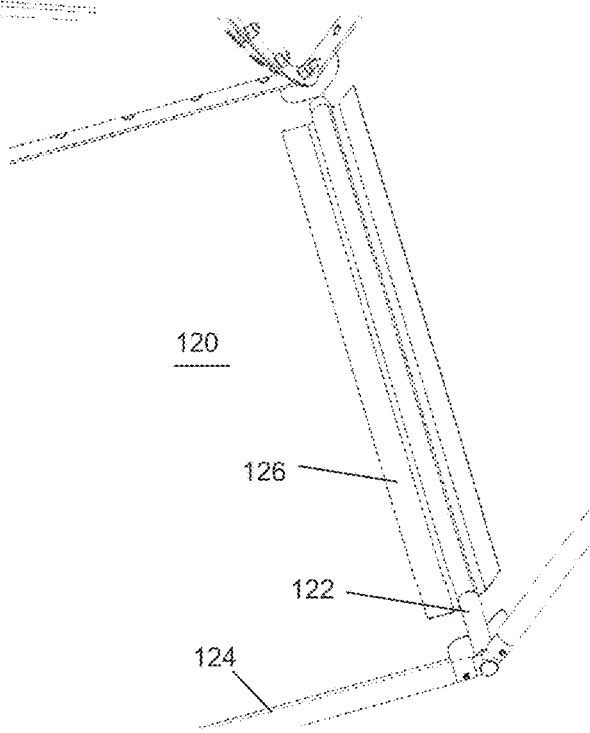
Figure 7M:
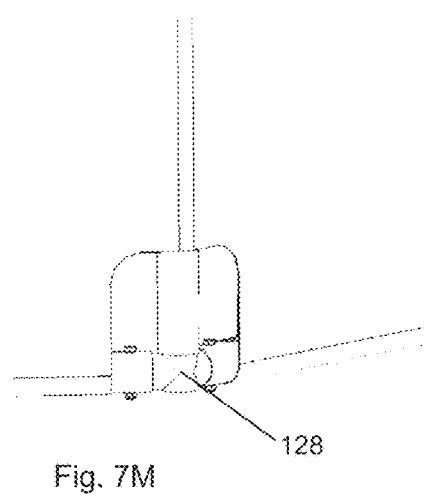

FIGS. 7E (and 7M) shows a detail of a lower end of a vertex wherein a two-way connector or a three-way connector 128 may be used to join the vertically-oriented strut 122 and adjacent horizontal fringe struts 124. In an exemplary embodiment, the struts 122, 124 are tubular and the three-way connector 128 comprises a three-pronged male member that inserts into the throughbore of each tube and secures thereto with an interference fit, or more securely with a bayonet lock, fasteners or the spring-loaded pins 130 shown. Adjacent panels 120 are desirably formed with small cutouts 132 at their lower corners to enable assembly of the frame struts. FIG. 7H further illustrates this assembly at the lower vertices of the frame. The connector 128 can be a two-way connector to provide a flexible connection between the horizontal and vertical tubes so as to allow the skirt to deform with the sea currents.

With reference again to FIG. 7A, an exemplary construction includes a series of throughholes (not shown) located along the top edges of each vertical panel 120 that may be secured to a frame member 136 attached to the border pipes 22, 24. That is, the frame members 136 are shown in FIG. 12A and may be secured at either end to a vertex of the octagonal periphery defined by the pipes 22, 24 or along the outside thereof such as with flanges on the pipes. In this way, the upper edge of the stabilizing skirt 116 connects around the array periphery. The upper corners of each panel 120 also have a cutout 132 to facilitate assembly.

One-Axis Tracking System:

A one-axis tracking system may be implemented which allows all the solar panels P being oriented toward the sun as much as possible during every hour of daylight. As seen in FIG. 8, (which schematically shows a combination of first and second pipes 22, 24) a single array 20 has four mooring lines 140 of textile or chain attached. Each mooring line 140 may be winched in a motorized windlass 142, as depicted in FIG. 8A. Two mooring lines are typically attached to a single anchor point that can be onshore or under water according to the site configuration. Although not shown, a control system including either a sensor for detecting the azimuth of the sun at all times or a simple timer calibrated for the season is connected to actuate the windlasses 142 and maintain the solar panels P facing the sun during the daylight hours.

The system may have two anchoring points and four mooring lines (typically a textile or rope type line connected to the anchor, and a chain connected to the other extremity of the rope). The chain is thus at the top part of the mooring line to be winded in the windlass. This arrangement is unconventional and different from the prior art, where the chain is connected to an anchor and the rope is this connected to the other extremity of the chain. Two mooring lines are attached to each anchor point. These anchoring points can be onshore or under water according to the site configuration. For small lakes or mine tailing, the two anchor points will be onshore, on a concrete foundation. Winches to wind and unwind the mooring lines are located at the anchor point or on the solar array. For larger water areas, or offshore applications in the sea water, the anchor points are under water; using typically a concrete block or a suction pile solution for each anchor.

For small lakes or mine tailing, the two anchor points will be onshore, on a concrete foundation nearby the water. In this case, the motors to wind and unwind the mooring lines are located at the anchor point.

For larger water areas, or even for offshore applications in the sea water, the two anchor points are under water, using typically a suction pile solution for each anchor. In this case, the motors to wind and unwind the mooring lines are located on the float, at each mooring line attachment.

The systems to wind and unwind the mooring lines are similar to the motors found in boats for light anchors.

The position of the attachment of the mooring lines on the float is essential to allow the float rotating at least ±60° within one day.

The attached simulations in FIGS. 9A-9E depict an array of floating solar arrays 20 of the present application with onshore anchors 144 and showing progressive movement during the day to maintain the solar panels facing the sun. In one embodiment, each anchor 144 connects to two corners of the rectangular array 20 via mooring lines 140. By pulling on one or the other of the mooring lines 140 in a coordinated fashion, the windlasses 142 (FIG. 8A) can rotate the array 20 total of 120°. This magnitude of rotation is sufficient to check the sun throughout the day, and prevents the mooring lines 140 from crossing each other.

In another embodiment, a plurality of discrete solar arrays 20 may be coupled together in series and connected to just two fixed anchor points, the solar arrays rotating in synchronism. For instance, FIGS. 10A-10E depicts an assembly of several linked arrays 20 of floating solar panels of the present application with underwater anchors 144 showing progressive movement during the day to maintain the solar panels facing the sun. In this embodiment, a pair of linking struts or cables 146 are rotatably mounted at midpoints along lateral sides of the arrays 20. The struts or cables 146 transmit tensile or pulling forces from the mooring lines 140 to all three arrays 20. The struts or cables 146 may be stiff to also transmit pushing forces. Again, the total rotation of 120° shown limits the possibility of overlap or tangling of the mooring lines 140.

In both simulations of FIGS. 9A-9E and 10A-10E, the anchors 144 are preferably aligned along a North-South axis so that the rotational position of 0° is attained at around noon during the day when the sun is directly in the South (when installed in the Northern hemisphere, and opposite when in the Southern hemisphere).

For small lakes or mine tailing, the two anchor points will likely be onshore, on a concrete foundation nearby the water. In this case, the motors to wind and unwind the mooring lines can be located at the anchor point.

For larger water areas, or even for offshore applications in the sea water, the two anchor points are under water, using typically a concrete block or a suction pile solution for each anchor. In this case, the motors to wind and unwind the mooring lines are located on the float, at each mooring line attachment.

The systems to wind and unwind the mooring lines are similar to the windlasses found in boats for light anchors. The angular position of the array does not need to be permanently adjusted for the panels to face the sun during the day. The mooring lines are wound and unwound 8 to 10 times every day, and thus the motors are operating only a few tens of seconds for every winding/unwinding (and not continuously to adjust the position).

A sensor to measure the variations of water level (for lakes or mine tailings) can also be installed on the float. Above a certain threshold of water level variations, the tension of the mooring lines can be modified with winding/unwinding operations to re-align the solar panels in front of the sun.

The position of the attachment of the mooring lines on the float is essential to allow the float rotating typically + and −60° within one day.

This one-axis tracking system can be adapted to several arrays connected together thanks to a tube or a bar with a similar density as the water upon which they are floating. With this configuration, only two anchor points and four mooring lines are necessary rotate synchronously all the arrays together.

Figure 11C:
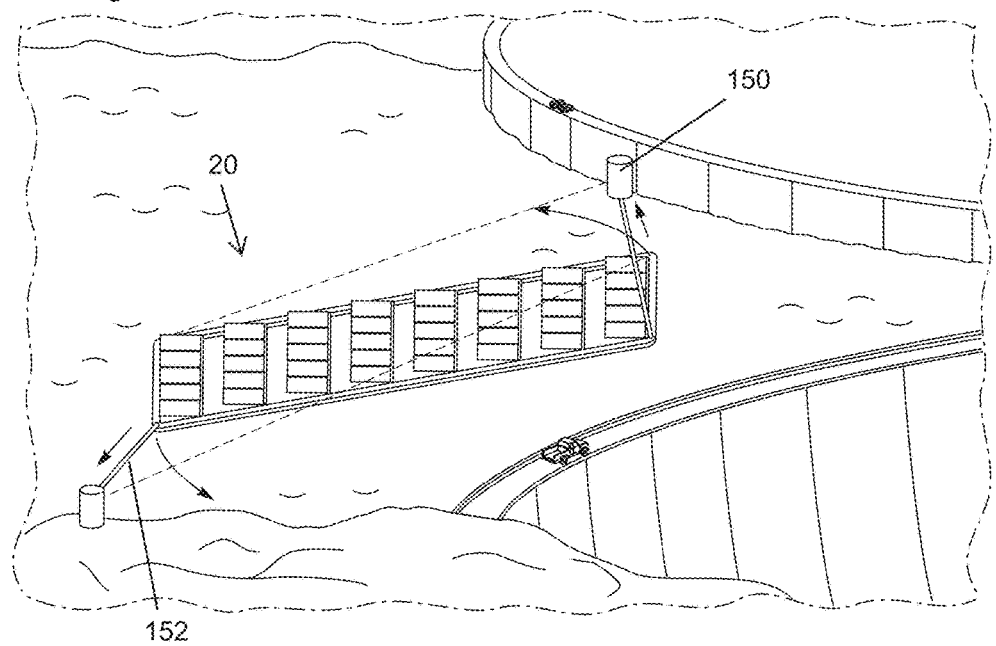
Figure 11D:
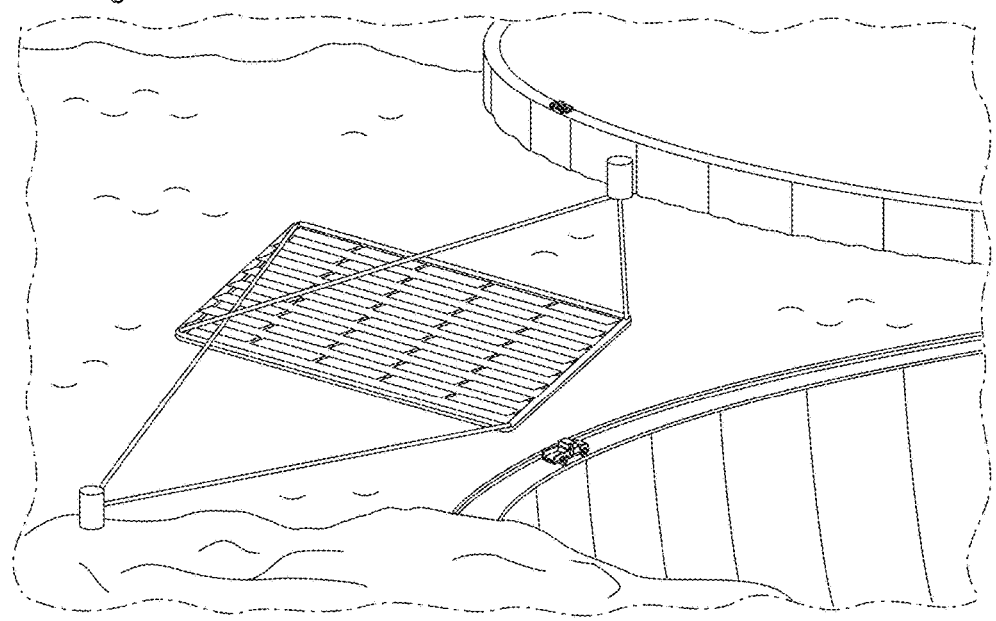

FIGS. 11A-11D illustrate a slightly different rotational tracking system showing two anchors 150 on opposite shores of a lake created behind a dam. The anchors connect via two mooring lines 152 to diametrically opposite corners of a floating solar panel array 20. FIG. 11A shows the tilted position of the panels P in the morning, and FIG. 11B shows the rotational adjustment as the sun starts to pass across the sky. FIG. 11C shows the panels having crossed a zero point during the afternoon, and FIG. 11B shows the final position of the array 20. To avoid crossover of the mooring lines 152, or otherwise catching the lines on structures on the array 20, they may be connected via upstanding posts or even posts that extend below the surface of the water.

FIGS. 12A and 12B illustrate from above and below an island 160 made up of multiple floating solar units or systems 162 aggregated into clusters. A "floating solar system" as defined herein comprises one of the floating solar arrays, units or systems 162, such as shown in various figures herein, whether rectangular, circular, or polygonal, while a "cluster or "island" of such individual units includes at least two connected together in aggregate. In the illustrated embodiment, the floating solar systems 162 each have an octagonal configuration defined by an outer pontoon 164 such that two each of their straight sides can be abutted against straight sides of adjacent units, with a square central converter area 172 formed therebetween. The outer pontoon 164 comprises the combination of the aforementioned outer pipes 22, 24 as seen in earlier figures. The solar panels P are shown flat in this embodiment and not tilted, though they may also be tilted. A flat panel array of non-inclined photovoltaic panels P is used mainly between the Tropics, with an optimal efficiency on the equator line.

FIGS. 12A-12B also show a stabilizing skirt 166 depending vertically downward from the pontoons 164. As with the earlier-described skirt, a series of horizontal and vertical tubes preferably provide a framework for the skirt 166 and ensures that the submerged skirt remains substantially vertical in the water. The horizontal tubes can also be replaced by a row of weights 168 providing also a lower fringe for the skirt 166 and ensuring that the submerged skirt remains substantially vertical in the water. A plurality of anchors or fixed feet 169 connect to the periphery of the floating solar system 162, such as to the corners of the four-sided or eight-sided pontoon 164 with cables or lines 170. In one embodiment, the floating solar system 162 deploys in a relatively shallow body of water, such as near-shore in the ocean, so that the lines 170 need not be unduly long. For instance, the feet 169 and lines 170 may be safely used to a depth of 10-20 meters. Other anchoring systems like dead weights or suction piles may also be utilized. Indeed, the feet 169 and lines 170 may represent a system of weights for holding the skirt 166 vertical. The skirt can also be held vertical thanks to vertical and/or horizontal tubes inserted in the skirt. Of course, a more robust system of anchorage may be used to greater depths as will be described. Alternatively, one or more of the floating solar systems 162 may have weighted skirts 166, but be tethered for rotation as was described above.

As mentioned above, each solar array 162 includes a plurality of electrical cables 171 interconnecting the photovoltaic panels P. In the illustrated embodiment, electrical cables 171 are shown connected to the terminal ends of three sides of the octagon, corresponding to three straight segments of the eight-sided pontoon 164. Because every row of panels P can thus be reached by the cables 171, a complete circuit is formed through all of the photovoltaic panels P. Parallel connecting cables are then used to combine the power generated by the panel rows, which can then be routed to a power converter, as will be described.

The skirts 166 may be provided around each of the floating solar systems 162, or a global skirt can be used around the assembly of units, such as shown in phantom at 174 in FIG. 12B. In the latter case, the combination of several floats lead to an increase of dimension of the column(s) of water for the moon pool effect, and thus to a change in the resonance period of this column. A specific calculation of the resonance period must thus be specifically calculated, as will be more fully understood below.

FIG. 12B also shows a protective grid, mesh or net 175 covering the underside of one of the solar units; in particular spanning across underneath the stabilizing skirt 166. The net 175 stops fish and marine animals from damaging the solar panels and the electrical cables and connections. In addition, the net 175 may act as a damping device in the moon pool system. The nets 175 are desirably easily dismantled for maintenance purpose, such as by securing them around their edges with large scale Velcro or the like.

The interconnected electrical cables 171 are eventually combined and routed to a power converter. The power converter typically processes direct current (DC) power into an alternating current (AC) for transmission to a remote location for consumption. There are different formats for mounting the converters next to the solar rays 162. For example, a mobile power converter may be attached directly to one side of the pontoon 164, most preferably to the segment of the pontoon on which the electrical cables 171 are mounted. The power converter may be supported on a platform which, in turn, is supported by a large float or buoy, and thus can be towed along with the rest of the floating solar system 162 to its collection location, and in general moves/rotates with the solar unit. Alternatively, a more robust autonomous converter can be fixed on the sea bottom via elongated legs. The floating solar system 162 is then structurally coupled to the free-standing converter via a cable or other such securement. Although not shown, an electrical transmission cable leads away from the converter toward a remote storage or consumption location.

Figure 12C:
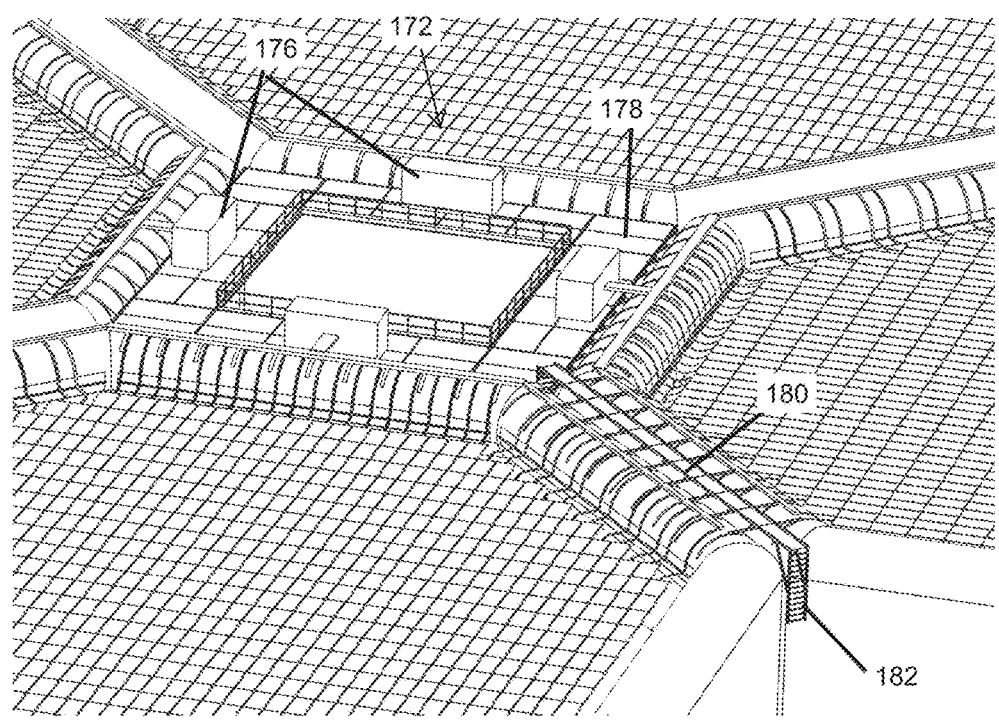
FIG. 12C is a close-up of a central converter area.

FIG. 12C illustrates the central converter area 172 preferably includes a converter 176 allocated to each of the floating solar systems 162 mounted on a common gangway 178. As mentioned above, the central converter area 172 may have flotation means, or maybe anchored to the sea bottom. To facilitate maintenance, an access pathway 180 is shown extending between adjacent straight sides of two of the units 162 leading to access ladders 182, the inner one of which is not visible. In this manner, technical personnel can easily access the central converter area 172 in the case of malfunction or routine maintenance. The central converter area 172 may be part of the overall floating island 160 anchored by the feet 169 and cables 170 of each of the units 162, or the central converter area 172 may represent a free-standing anchorage.

Figure 13A:
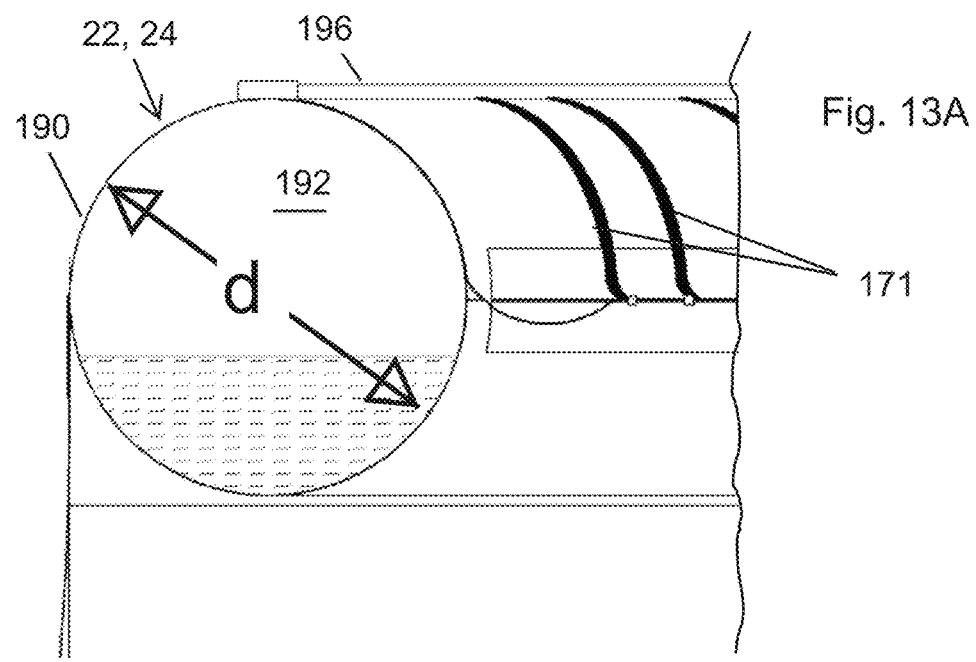
FIGS. 13A and 13B are sectional and partial views of an exemplary border pontoon and electric cable networks for the floating solar systems.
Figure 13B:
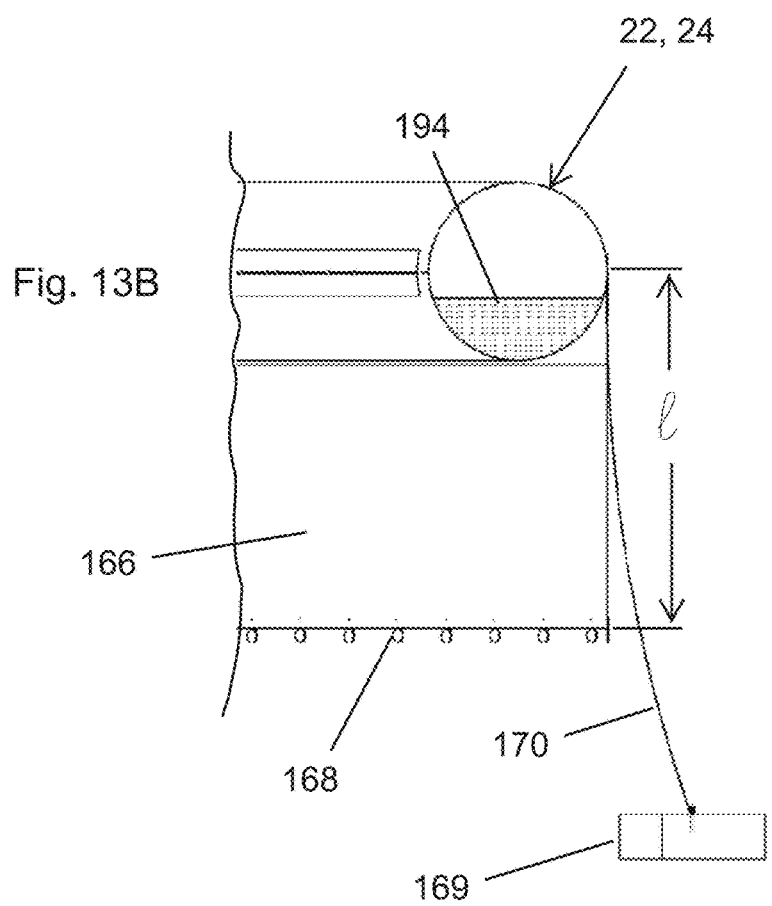

FIGS. 13A and 13B are sectional views of an exemplary pipe 22, 24 comprising a tubular hollow buoy 190. The surrounding stabilizing skirt 166 having the weighted fringe 168 is shown hanging down from an outer generatrix of the buoy 190. An anchoring foot 169 connects via the cable 170 to the stabilizing skirt 166. An internal chamber 192 of the buoy 190 may be partially filled with water 194 as ballast for increased stability.

The electric cables 171 that transmit power from the solar array 24 are shown extending upward from the array to an upper frame member 196 fastened to the top of the buoy 190. The parallel electric cables that combine the power of the individual photovoltaic panels P are desirably routed through the enclosed frame member 196 to protect them from the elements.

Figure 14:
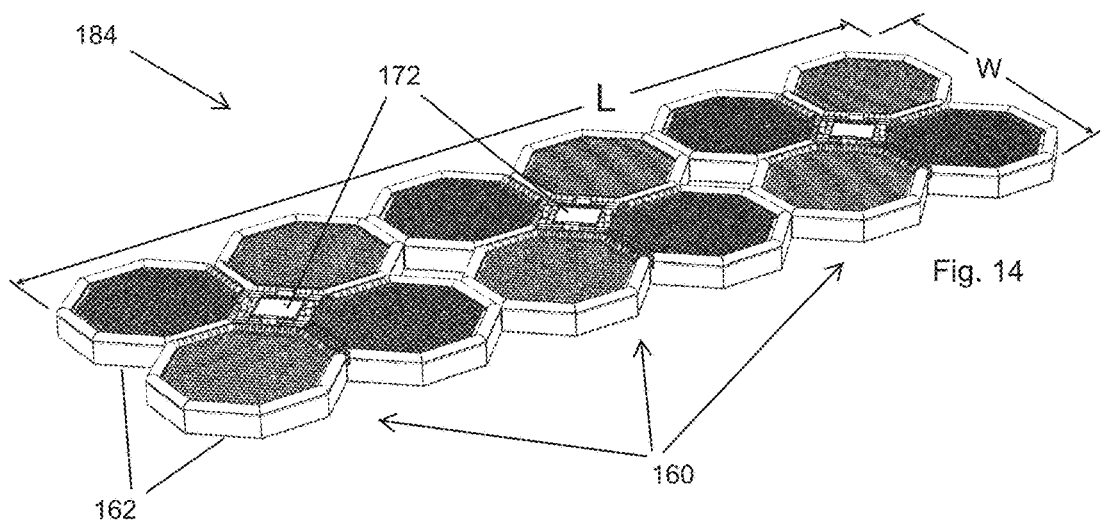
FIG. 14 is a perspective view of a larger cluster of connected floating solar systems.

FIG. 14 is a perspective view of a larger cluster 184 of connected floating solar islands 160, such as that shown in FIGS. 12A and 12B. In the configuration shown, three of the solar islands 160 are attached to one another in a linear fashion so as to form an elongated cluster having a length L and a width W. The overall length L and width W depends on the dimensions of the individual floating solar systems 162. If, for example, the solar units 162 have a diameter (approximate across diametrically opposed straight sides) of between 40-80 m, the overall length L would be between 240-480 m, and the width W would be between 80-160 m. Of course, different shapes and arrangements of the individual solar units 162 are contemplated, the elongated cluster 184 shown in FIG. 14 being exemplary only. It should be noted, however, that forming clusters of no more than two solar units wide enables rapid access to the central converter areas 172 of each modular island 160. Furthermore, as mentioned above, each individual solar unit 162 may be anchored to the sea bottom, or a series of power-like anchors may be utilized either underneath the central converter areas 172 or to the outside of the cluster 84.

The floats will have typical length or width of 50 meters. They will be installed close to lakes, mine tailings, rivers or sea shores, which have very often some area nearby available for assembly, but likely not a wide enough flat surface to assemble the structure in one row. This issue has been solved with the use of flexible material like high density polyethylene, which is flexible enough to accommodate variations of height in the assembly field. That is, the entire array may be nonplanar in the direction of both rows of flexible tubes or pipes 22, 24 to facilitate assembly.

Figure 15:
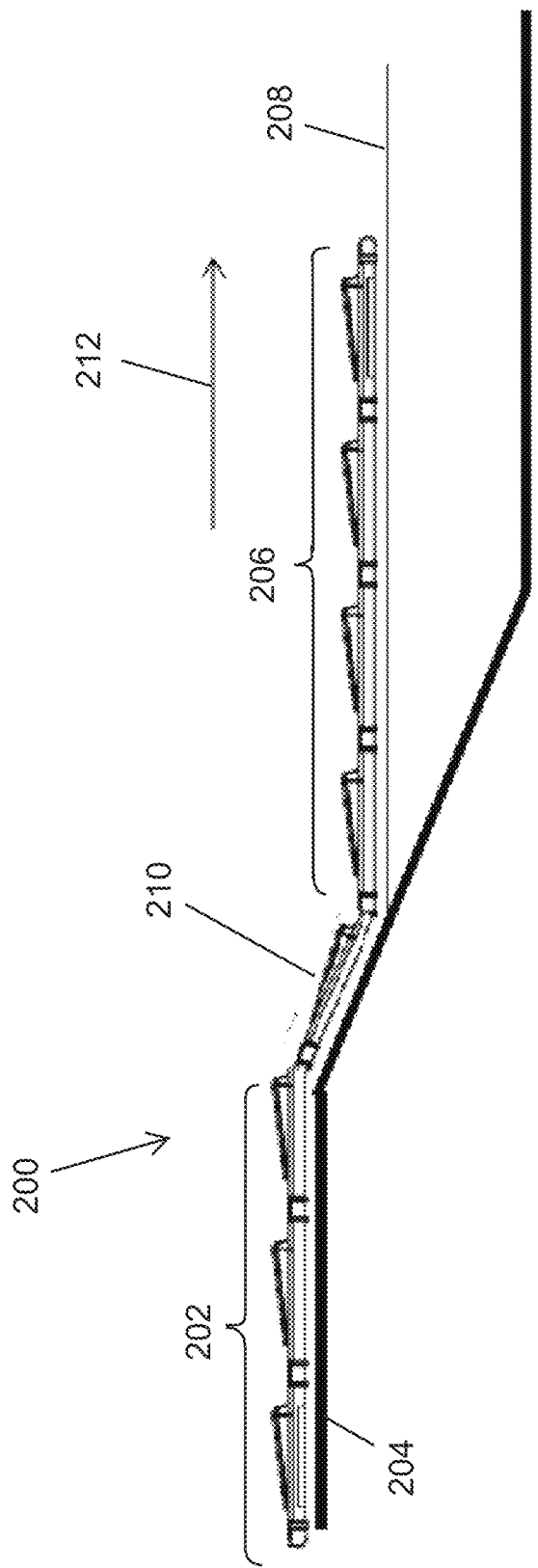
FIG. 15 shows an exemplary procedure of a floating solar array being assembled on a dock while a portion that has already been assembled is launched to float on an adjacent surface of water.

For instance, FIG. 15 shows an exemplary assembly procedure of an array 200 wherein a first portion 202 is being assembled on a dock 204 or other form of solid surface, while a second portion 206 has already been assembled and has been launched to float on the adjacent surface 208 of a body of water. A mid-section 210 of the array 200 has sufficient longitudinal flexibility to descend from the dock 204 onto the water surface 208. Of course, the array 200 preferably also has flexible pipes in the lateral direction meaning the array can also flex along that axis (three-dimensional flexibility) and the dock 204 need not be laterally planar. This shows that if the assembly area is not wide enough, the float can be progressively launched in the water, even if the terrain is not flat, thanks to the flexibility of the pipes 22, 24. A movement arrow 212 indicates the direction that the array 200 moves as sections are assembled, such as by towing the leading edge with a boat.

Figure 16A:
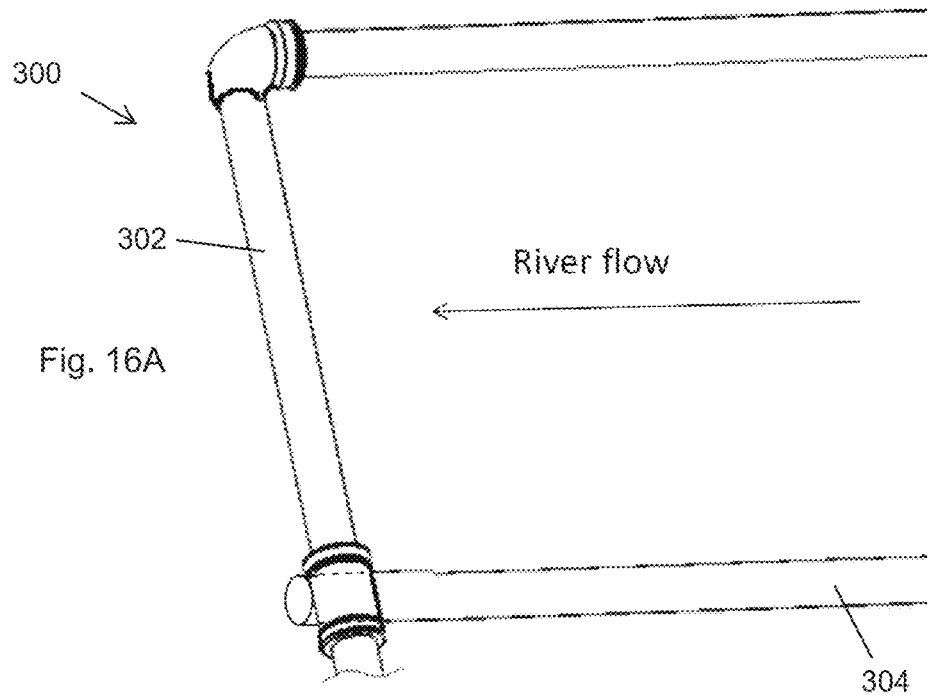
FIGS. 16A and 16B are two partial views of a floating solar array of the present application configured for flotation in a river.
Figure 16B:
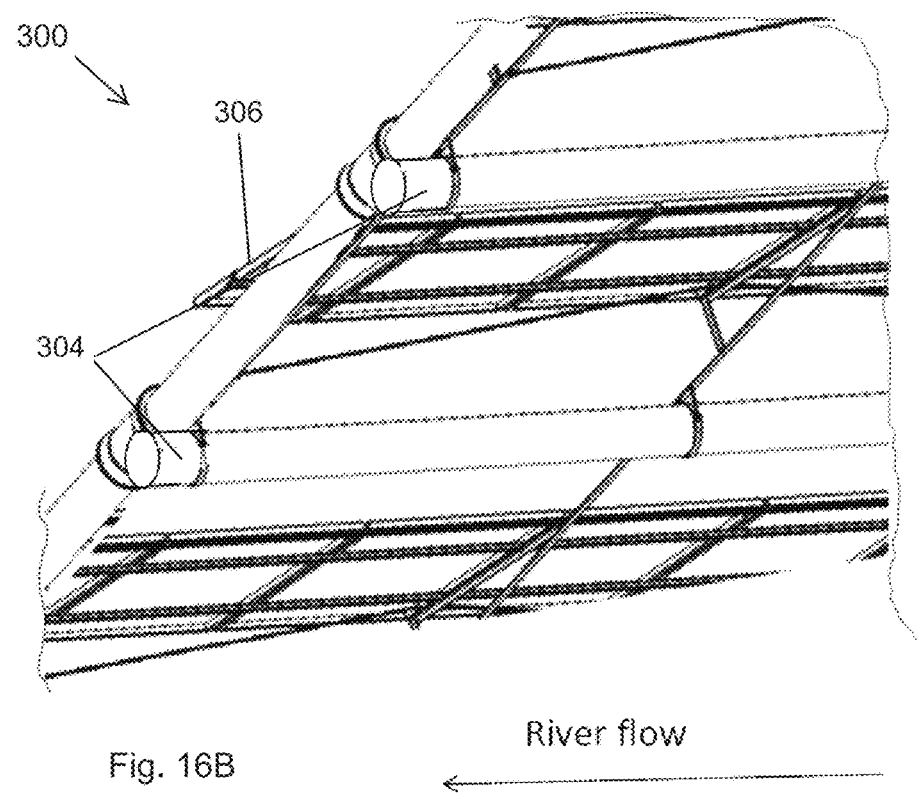

FIGS. 16A and 16B are two partial views of a floating solar array 300 of the present application configured for flotation in a river. The array 300 has rows of first pipes 302 assembled together with perpendicular columns of second pipes 304. The second pipes 304 extend under the first pipes 302 and provide buoyancy for the array 300. A plurality of solar panels as described above are mounted to and over the rows of first pipes 302.

In a preferred embodiment, only the columns of second pipes 304 are parallel to the river flow (indicated) and are submerged, and that the rows of first pipes 302 perpendicular to the river flow are at a higher altitude. The pipes 302 perpendicular to the river flow will therefore be above the current and will not "work" against the flow of the river, whereas the pipes 304 parallel to the river flow will provide buoyancy without "working" against the flow of the river.

The connections between the first and second pipes 304 will be made possible with non-standard electro-fusion fittings, available from various suppliers. The pipe sections 302, 304 are preferably made of polyethylene, plugged at their extremities, with aluminum or metallic frames (typically angle bars or tubes) connected to the pipe sections with several collets and side rods, and mechanically holding several solar panels connected together.

Material and Shape of the Float:

High density polyethylene or polypropylene may be used for all the pipes.

Also, using pipes for the float is a different solution from the "table" proposed in U.S. Pat. No. 4,786,795 patent, as indeed the table is a rigid body (like a barge), and the assembly of pipes is a flexible structure which can deform both during installation and on the water (under the swell generated by the wind on large lakes, or over the sea if this solution is used in an offshore environment). The environmental impact of this solution based on pipes is also improved compared to a "table" solution, as some sun rays can still go underwater.

Our solution to fix the solar panels on the pipes is also new, as we use collets around pipes.

Antifouling Protection:

To limit accumulation of algae on the pipes, on the anti-lift membrane and on the skirt, a layer of a polyvinyl fluoride (PVF) film such as Tedlar® may be glued on the surfaces in the contact with the water. This layer of Tedlar® may typically have a thickness of 10 to 50 µm, and could cover all the surfaces in contact with the water. Tedlar® is a biaxially oriented polyvinyl fluoride film available from DuPont that exhibits excellent resistance to weathering, outstanding mechanical properties, and inertness towards a wide variety of chemicals, solvents, and staining agents.

Orientation System:

The rotating system with cables is innovative in two ways:

It is only a two-point anchoring system (contrary to the conventional three to four anchor point system used in comparable applications), allowing a ±60° rotation.

It can rotate together several floating arrays with a set of only four winches.

This system can thus be easily fixed on two shores on a lake/dam/mine tailing, which is often more difficult to do with a three-point anchor system.

While the invention has been described in its preferred embodiments, it is to be understood that the words which have been used are words of description and not of limitation. Therefore, changes may be made within the appended claims without departing from the true scope of the invention.

What is claimed is:

1. A floating solar array, comprising:
    a series of connected rows and columns of buoyant flexible pipes connected by electro-welded or thermo-welded fittings with elbow connections at corner junctions of two pipes and T-fittings at junctions of three pipes;
    a plurality of rows of photovoltaic panels each mounted at an angle over the connected rows and columns so as to face upward, the rows of photovoltaic panels extending laterally in parallel to the rows of flexible pipes, the columns extending longitudinally perpendicular to the rows; and
    anti-lift membranes of polyethylene or polypropylene or EPDM (Ethylene Propylene Diene Monomer rubber) attached to some of the connected rows and columns of flexible pipes so as to extend below and stay underwater and act an anti-lift system for the solar array, wherein the anti-lift membranes have outer surfaces in contact with the water covered with a layer of polyvinyl fluoride (PVF) film for anti-fouling protection.

2. The solar array of claim 1, wherein the flexible pipes are made of high density polyethylene or polypropylene.

3. The solar array of claim 1, wherein at least one of the anti-lift membranes is secured between two adjacent rows of the flexible pipes and has a generally rectangular mid-portion that extends between and parallel to the adjacent rows of first pipes, the mid-portion being secured to the adjacent rows of first pipes with a plurality of outwardly extending flaps that extend perpendicular to the mid-portion such that the mid-portion droops down and water flows between the flaps and collects on top of it.

4. The solar array of claim 1, wherein a plurality of solar arrays are assembled together to define a closed loop shape which is a square shape, a rectangular shape, or a polygonal shape.

5. The solar array of claim 1, wherein a plurality of solar arrays are assembled together to define a circular closed loop shape.

6. The solar array of claim 1, further comprising metallic frames including angle bars or tubes attached in a longitudinal direction perpendicular to the lateral direction, connected to the pipes with collets and side rods, and mechanically holding several solar panels connected together with triangular frames defining the angle of the panels.

7. The solar array of claim 1, further comprising a stabilizing skirt downwardly-depending from the outer periphery to surround a column of water underneath the solar array, the stabilizing skirt being rigidified with interconnected horizontal and vertical tubes made of a material having a higher density than water to remain substantially vertical in the water and form a barrier so as to create a more stable column of water within than outside of the barrier.

8. The solar array of claim 1, further comprising:
    a tracking system configured to rotate the solar array around a vertical axis and face the angled photovoltaic panels toward the sun during the day using winches installed at corners of the floating array attached to mooring lines connected to fixed anchor points.

9. The solar array of claim 8, wherein a plurality of solar arrays are assembled together to define a closed loop shape that approaches a circle.

10. The solar array of claim 8, wherein the mooring lines are made of rope or textile material along a length connected to the fixed anchor points, and the mooring lines are made of chain along a length connected to the winch.

11. The solar array of claim 8, wherein there are only two anchor points each connected to two mooring lines that extend to different corners on the solar array and terminate at one of the winches.

12. The solar array of claim 8, wherein a plurality of discrete solar arrays are coupled together in series and connected to just two fixed anchor points, the solar arrays rotating in synchronism.

13. The solar array of claim 8, further comprising a stabilizing skirt downwardly-depending from the outer periphery to surround a column of water underneath the solar array, the stabilizing skirt being rigidified with interconnected horizontal and vertical tubes made of a material having a higher density than water to remain substantially vertical in the water and form a barrier so as to create a more stable column of water within than outside of the barrier.

14. A floating solar array, comprising:
- a series of connected rows and columns of buoyant flexible pipes;
- a plurality of rows of photovoltaic panels each mounted at an angle over the connected rows and columns so as to face upward, the rows of photovoltaic panels extending laterally in parallel to the rows of flexible pipes, the columns extending longitudinally perpendicular to the rows; and
- anti-lift membranes of polyethylene or polypropylene or EPDM (Ethylene Propylene Diene Monomer rubber) attached to some of the connected rows and columns of flexible pipes so as to extend below and stay underwater and act an anti-lift system for the solar array, wherein at least one of the anti-lift membranes is secured between two adjacent rows of the flexible pipes and has a generally rectangular mid-portion that extends between and parallel to the adjacent rows of first pipes, the mid-portion being secured to the adjacent rows of first pipes with a plurality of outwardly extending flaps that extend perpendicular to the mid-portion such that the mid-portion droops down and water flows between the flaps and collects on top of it.

15. The solar array of claim 14, further comprising a tracking system configured to rotate the solar array around a vertical axis and face the angled photovoltaic panels toward the sun during the day using winches installed at corners of the floating array attached to mooring lines connected to fixed anchor points.

16. The solar array of claim 14, wherein a plurality of solar arrays are assembled together to define a closed loop shape that approaches a circle.

17. The solar array of claim 14, wherein a plurality of solar arrays are assembled together to define a closed loop shape which is a square shape, a rectangular shape, or a polygonal shape.

* * * * *